(12) United States Patent
Daniel

(10) Patent No.: US 9,468,988 B2
(45) Date of Patent: Oct. 18, 2016

(54) SYSTEMS, METHODS, AND APPARATUSES FOR MONITORING WELD QUALITY

(71) Applicant: Lincoln Global, Inc., City of Industry, CA (US)

(72) Inventor: Joseph A. Daniel, Sagamore Hills, OH (US)

(73) Assignee: Lincoln Global, Inc., City of Industry, CA (US)

(*) Notice: Subject to any disclaimer, the term of this patent is extended or adjusted under 35 U.S.C. 154(b) by 0 days.

(21) Appl. No.: 14/536,813

(22) Filed: Nov. 10, 2014

(65) Prior Publication Data

US 2015/0060424 A1 Mar. 5, 2015

Related U.S. Application Data

(63) Continuation-in-part of application No. 13/453,124, filed on Apr. 23, 2012, now Pat. No. 8,884,177, which is a continuation-in-part of application No. 12/775,729, filed on May 7, 2010, now Pat. No. 8,569,646.

(60) Provisional application No. 61/261,079, filed on Nov. 13, 2009.

(51) Int. Cl.
*B23K 31/02* (2006.01)
*B23K 9/095* (2006.01)
*B23K 31/12* (2006.01)

(52) U.S. Cl.
CPC .......... *B23K 9/0953* (2013.01); *B23K 31/12* (2013.01)

(58) Field of Classification Search
CPC .... B23K 31/125; B23K 31/12; B23K 9/095; B23K 9/092–9/093; B23K 9/0953
See application file for complete search history.

(56) References Cited

U.S. PATENT DOCUMENTS

| 1,159,119 | A | 11/1915 | Springer |
| D140,630 | S | 3/1945 | Garibay |
| D142,377 | S | 9/1945 | Dunn |

(Continued)

FOREIGN PATENT DOCUMENTS

| CA | 2698078 | 9/2011 |
| CN | 101209512 | 7/2008 |

(Continued)

OTHER PUBLICATIONS

Echtler et al, "17 The Intelligent Welding Gun: Augmented Reality for Experimental Vehicle Construction," Virtual and Augmented Reality Applications in Manufacturing (2003) pp. 1-27.

(Continued)

*Primary Examiner* — Cuong B Nguyen
(74) *Attorney, Agent, or Firm* — Hahn Loeser & Parks LLP

(57) ABSTRACT

An arc welding system and methods. The system is capable of monitoring variables during a welding process, according to wave shape states, and weighting the variables accordingly, detecting defects of a weld, diagnosing possible causes of the defects, quantifying overall quality of a weld, obtaining and using data indicative of a good weld, improving production and quality control for an automated welding process, teaching proper welding techniques, identifying cost savings for a welding process, and deriving optimal welding settings to be used as pre-sets for different welding processes or applications.

18 Claims, 21 Drawing Sheets

(56) References Cited

U.S. PATENT DOCUMENTS

| | | |
|---|---|---|
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,621,177 A | 11/1971 | McPherson et al. |
| 3,654,421 A | 4/1972 | Streetman et al. |
| 3,739,140 A | 6/1973 | Rotilio |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros et al. |
| 4,280,041 A | 7/1981 | Kiesslilng et al. |
| 4,280,137 A | 7/1981 | Ashida et al. |
| 4,314,125 A | 2/1982 | Nakamura |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Tradt |
| 4,452,589 A | 6/1984 | Denison |
| D275,292 S | 8/1984 | Bouman |
| D277,761 S | 2/1985 | Korovin et al. |
| D280,329 S | 8/1985 | Bouman |
| 4,611,111 A | 9/1986 | Baheti et al. |
| 4,616,326 A | 10/1986 | Meier et al. |
| 4,629,860 A | 12/1986 | Lindbom |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,285,916 A | 2/1994 | Ross |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| D365,583 S | 12/1995 | Viken |
| 5,562,843 A | 10/1996 | Yasumoto |
| 5,670,071 A | 9/1997 | Ueyama et al. |
| 5,676,503 A | 10/1997 | Lang |
| 5,676,867 A | 10/1997 | Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,751,258 A | 5/1998 | Fergason et al. |
| D395,296 S | 6/1998 | Kaye et al. |
| D396,238 S | 7/1998 | Schmitt |
| 5,781,258 A | 7/1998 | Debral et al. |
| 5,823,785 A | 10/1998 | Matherne, Jr. |
| 5,835,077 A | 11/1998 | Dao et al. |
| 5,835,277 A | 11/1998 | Hegg |
| 5,845,053 A | 12/1998 | Watanabe et al. |
| 5,963,891 A | 10/1999 | Walker et al. |
| 6,008,470 A | 12/1999 | Zhang et al. |
| 6,049,059 A | 4/2000 | Kim |
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand et al. |
| 6,236,013 B1 | 5/2001 | Delzenne |
| 6,236,017 B1 | 5/2001 | Smartt et al. |
| 6,242,711 B1 | 6/2001 | Cooper |
| 6,271,500 B1 | 8/2001 | Hirayama et al. |
| 6,330,938 B1 | 12/2001 | Herve et al. |
| 6,330,966 B1 | 12/2001 | Eissfeller |
| 6,331,848 B1 | 12/2001 | Stove et al. |
| D456,428 S | 4/2002 | Aronson et al. |
| 6,373,465 B2 | 4/2002 | Jolly et al. |
| D456,828 S | 5/2002 | Aronson et al. |
| D461,383 S | 8/2002 | Balckburn |
| 6,441,342 B1 | 8/2002 | Hsu |
| 6,445,964 B1 | 9/2002 | White et al. |
| 6,492,618 B1 | 12/2002 | Flood et al. |
| 6,506,997 B2 | 1/2003 | Matsuyama |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,621,049 B2 | 9/2003 | Suzuki |
| 6,624,388 B1 | 9/2003 | Blankenship et al. |
| D482,171 S | 11/2003 | Vui et al. |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 7,021,937 B2 | 4/2006 | Simpson et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey et al. |
| 7,247,814 B2 | 7/2007 | Ott |
| D555,446 S | 11/2007 | Picaza Ibarrondo |
| 7,315,241 B1 | 1/2008 | Daily et al. |
| D561,973 S | 2/2008 | Kinsley et al. |
| 7,353,715 B2 | 4/2008 | Myers |

(56) References Cited

U.S. PATENT DOCUMENTS

| | | |
|---|---|---|
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,478,108 B2 | 1/2009 | Townsend et al. |
| D587,975 S | 3/2009 | Aronson et al. |
| 7,516,022 B2 | 4/2009 | Lee et al. |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,777,629 B2 | 7/2014 | Kreindl et al. |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0046999 A1 | 4/2002 | Veikkolainen et al. |
| 2002/0050984 A1 | 5/2002 | Roberts |
| 2002/0085843 A1 | 7/2002 | Mann |
| 2002/0175897 A1 | 11/2002 | Pelosi |
| 2003/0000931 A1 | 1/2003 | Ueda et al. |
| 2003/0023592 A1 | 1/2003 | Modica et al. |
| 2003/0025884 A1 | 2/2003 | Hamana et al. |
| 2003/0106787 A1 | 6/2003 | Santilli |
| 2003/0111451 A1 | 6/2003 | Blankenship et al. |
| 2003/0172032 A1 | 9/2003 | Choquet |
| 2003/0234885 A1 | 12/2003 | Pilu |
| 2004/0020907 A1 | 2/2004 | Zauner et al. |
| 2004/0035990 A1 | 2/2004 | Ackeret |
| 2004/0050824 A1 | 3/2004 | Samler |
| 2004/0140301 A1 | 7/2004 | Blankenship et al. |
| 2005/0007504 A1 | 1/2005 | Fergason |
| 2005/0017152 A1 | 1/2005 | Fergason |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 6/2005 | Blankenship |
| 2005/0159840 A1 | 7/2005 | Lin et al. |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0252897 A1 | 11/2005 | Hsu |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0136183 A1 | 6/2006 | Choquet |
| 2006/0163227 A1 | 7/2006 | Hillen et al. |
| 2006/0169682 A1 | 8/2006 | Kainec et al. |
| 2006/0173619 A1 | 8/2006 | Brant et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 | 2/2007 | Lee et al. |
| 2007/0045488 A1 | 3/2007 | Shin |
| 2007/0088536 A1 | 4/2007 | Ishikawa |
| 2007/0112889 A1 | 5/2007 | Cook et al. |
| 2007/0198117 A1 | 8/2007 | Wajihuddin |
| 2007/0211026 A1 | 9/2007 | Ohta |
| 2007/0221797 A1 | 9/2007 | Thompson et al. |
| 2007/0256503 A1 | 11/2007 | Wong et al. |
| 2007/0277611 A1 | 12/2007 | Portzgen et al. |
| 2007/0291035 A1 | 12/2007 | Vesely et al. |
| 2008/0031774 A1 | 2/2008 | Magnant et al. |
| 2008/0038702 A1 | 2/2008 | Choquet |
| 2008/0078811 A1 | 4/2008 | Hillen et al. |
| 2008/0078812 A1 | 4/2008 | Peters et al. |
| 2008/0117203 A1 | 5/2008 | Gering |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0314887 A1 | 12/2008 | Stoger et al. |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0057286 A1 | 3/2009 | Ihara et al. |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0259444 A1 | 10/2009 | Dolansky et al. |
| 2009/0298024 A1 | 12/2009 | Batzler et al. |
| 2009/0325699 A1 | 12/2009 | Delgiannidis |
| 2010/0012017 A1 | 1/2010 | Miller |
| 2010/0012637 A1 | 1/2010 | Jaeger |
| 2010/0048273 A1 | 2/2010 | Wallace et al. |
| 2010/0062405 A1 | 3/2010 | Zboray et al. |
| 2010/0062406 A1 | 3/2010 | Zboray et al. |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper et al. |
| 2010/0299101 A1 | 11/2010 | Shimada et al. |
| 2010/0307249 A1 | 12/2010 | Lesage et al. |
| 2011/0006047 A1 | 1/2011 | Penrod et al. |
| 2011/0060568 A1 | 3/2011 | Goldfine et al. |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy et al. |
| 2011/0122495 A1 | 5/2011 | Togashi |
| 2011/0183304 A1 | 7/2011 | Wallace et al. |
| 2011/0248864 A1 | 10/2011 | Becker et al. |
| 2011/0316516 A1 | 12/2011 | Schiefermuller et al. |
| 2012/0189993 A1 | 7/2012 | Kindig et al. |
| 2012/0291172 A1 | 11/2012 | Wills et al. |
| 2012/0298640 A1 | 11/2012 | Conrardy et al. |
| 2013/0026150 A1 | 1/2013 | Chantry et al. |
| 2013/0040270 A1 | 2/2013 | Albrecht |
| 2013/0075380 A1 | 3/2013 | Albrech et al. |
| 2013/0189657 A1 | 7/2013 | Wallace et al. |
| 2013/0189658 A1 | 7/2013 | Peters et al. |
| 2013/0230832 A1 | 9/2013 | Peters et al. |
| 2014/0038143 A1 | 2/2014 | Daniel et al. |
| 2014/0134580 A1 | 5/2014 | Becker |
| 2014/0263224 A1 | 9/2014 | Becker |

(56) References Cited

U.S. PATENT DOCUMENTS

| | | |
|---|---|---|
| 2014/0272836 A1 | 9/2014 | Becker |
| 2014/0272837 A1 | 9/2014 | Becker |
| 2014/0272838 A1 | 9/2014 | Becker |
| 2015/0056584 A1 | 2/2015 | Boulware et al. |
| 2015/0056585 A1 | 2/2015 | Boulware et al. |
| 2015/0056586 A1 | 2/2015 | Penrod et al. |

FOREIGN PATENT DOCUMENTS

| | | |
|---|---|---|
| CN | 101214178 A | 7/2008 |
| CN | 201083660 Y | 7/2008 |
| CN | 101419755 A1 | 4/2009 |
| CN | 201229711 Y | 4/2009 |
| CN | 101571887 A | 11/2009 |
| CN | 101587659 A | 11/2009 |
| CN | 103871279 A | 6/2014 |
| DE | 28 33 638 A1 | 2/1980 |
| DE | 30 46 634 A1 | 1/1984 |
| DE | 32 44 307 A1 | 5/1984 |
| DE | 35 22 581 A1 | 1/1987 |
| DE | 4037879 A1 | 6/1991 |
| DE | 196 15 069 A1 | 10/1997 |
| DE | 197 39 720 C1 | 10/1998 |
| DE | 19834205 A1 | 2/2000 |
| DE | 200 09 543 U1 | 8/2001 |
| DE | 10 2005 047 204 A1 | 4/2007 |
| DE | 10 2010 038 902 A1 | 2/2012 |
| DE | 202012013151 U1 | 2/2015 |
| EP | 0 108 599 A1 | 5/1984 |
| EP | 0 127 299 | 12/1984 |
| EP | 0 145 891 A1 | 6/1985 |
| EP | 319623 B1 | 10/1990 |
| EP | 0852986 A1 | 7/1998 |
| EP | 1 527 852 A1 | 5/2005 |
| EP | 1905533 A2 | 4/2008 |
| ES | 2 274 736 A1 | 5/2007 |
| ES | 2274736 A1 | 5/2007 |
| FR | 1456780 | 3/1965 |
| FR | 2 827 066 A1 | 1/2003 |
| FR | 2 926 660 A1 | 7/2009 |
| GB | 1 455 972 | 11/1976 |
| GB | 1 511 608 | 5/1978 |
| GB | 2 254 172 A | 9/1992 |
| GB | 2435838 A | 9/2007 |
| GB | 2 454 232 A | 5/2009 |
| JP | 2-224877 | 9/1990 |
| JP | 05-329645 | 12/1993 |
| JP | 07-047471 | 2/1995 |
| JP | 07-232270 | 9/1995 |
| JP | 08-505091 | 4/1996 |
| JP | 08-150476 | 6/1996 |
| JP | 08-132274 | 5/1998 |
| JP | 2000-167666 A | 6/2000 |
| JP | 2001-071140 A | 3/2001 |
| JP | 2002278670 A | 9/2002 |
| JP | 2003-200372 A | 7/2003 |
| JP | 2003-326362 A | 11/2003 |
| JP | 2006-006604 A | 1/2006 |
| JP | 2006-281270 A | 10/2006 |
| JP | 2007-290025 A | 11/2007 |
| JP | 2009-500178 A | 1/2009 |
| JP | 2009160636 A | 7/2009 |
| JP | 2012024867 A | 2/2012 |
| KR | 20090010693 | 1/2009 |
| RU | 2008 108 601 C1 | 11/2009 |
| SU | 1038963 A1 | 8/1983 |
| WO | 98/45078 | 10/1998 |
| WO | 0112376 A1 | 2/2001 |
| WO | 01/43910 | 6/2001 |
| WO | 0158400 A1 | 8/2001 |
| WO | 2005102230 A1 | 11/2005 |
| WO | 2006034571 A1 | 4/2006 |
| WO | 2007039278 | 4/2007 |
| WO | 2009120921 | 1/2009 |
| WO | 2009060231 A1 | 5/2009 |
| WO | 2009149740 A1 | 12/2009 |
| WO | 2010000003 A2 | 1/2010 |
| WO | 2010044982 | 4/2010 |
| WO | 2010091493 A1 | 8/2010 |
| WO | 2011045654 A1 | 4/2011 |
| WO | 2011058433 | 5/2011 |
| WO | 2011058433 A1 | 5/2011 |
| WO | 2011067447 A1 | 6/2011 |
| WO | 2011097035 A2 | 8/2011 |
| WO | 2012082105 A1 | 6/2012 |
| WO | 2012143327 A1 | 10/2012 |
| WO | 2013014202 A1 | 1/2013 |
| WO | 2013114189 A1 | 8/2013 |
| WO | 2013175079 A1 | 11/2013 |
| WO | 2014007830 A1 | 1/2014 |
| WO | 2014019045 A1 | 2/2014 |
| WO | 2014020386 | 2/2014 |

OTHER PUBLICATIONS

Teeravarunyou et al, "Computer Based Welding Training System," International Journal of Industrial Engineering (2009) 16(2): 116-125.

Antonelli et al, "A Semi-Automated Welding Station Exploiting Human-Robot Interaction," Advanced Manufacturing Systems and Technology (2011) pp. 249-260.

Praxair Technology Inc, "The RealWeld Trainer System: Real Weld Training Under Real Conditions" Brochure (2013) 2 pages.

"System for Characterizing Manual Welding Operations on Pipe and Other Curved Structures," U.S. Appl. No. 62/055,724, filed Sep. 26, 2014, 35 pages.

Lincoln Global, Inc., "VRTEX 360: Virtual Reality Arc Welding Trainer" Brochure (2015) 4 pages.

Wuhan Onew Technology Co Ltd, "ONEW-360 Welding Training Simulator" http://en.onewtech.com/_d276479751.htm as accessed on Jul. 10, 2015, 12 pages.

The Lincoln Electric Company, "VRTEX Virtual Reality Arc Welding Trainer," http://www.lincolnelectric.com/en-us/equipment/training-equipment/Pages/vrtex.aspx as accessed on Jul. 10, 2015, 3 pages.

Miller Electric Mfg Co, "LiveArc: Welding Performance Management System" Owner's Manual, (Jul. 2014) 64 pages.

Miller Electric Mfg Co, "LiveArc Welding Performance Management System" Brochure, (Dec. 2014) 4 pages.

SIMFOR / CESOL, "RV-SOLD" Welding Simulator, Technical and Functional Features, 20 pages, date unknown.

International Search Report for PCT/IB2009/00605.

Robert Schoder, "Design and Implementation of a Video Sensor for Closed Loop Control of Back Bead Weld Puddle Width," Massachusetts, Institute of Technology, Dept. of Mechanical Engineering, May 27, 1983, 64 pages.

Hills and Steele, Jr.; "Data Parallel Algorithms", Communications of the ACM, Dec. 1986, vol. 29, No. 12, p. 1170.

Nancy C. Porter, J. Allan Cote, Timothy D. Gifford, and Wim Lam, Virtual Reality Welder Training, 29 pages, dated Jul. 14, 2006.

J.Y. (Yosh) Mantinband, Hillel Goldenberg, Llan Kleinberger, Paul Kleinberger, Autosteroscopic, field-sequential display with full freedom of movement or Let the display were the shutter-glasses, 3ality (Israel) Ltd., 8 pages, 2002.

Ars Electronica Linz Gmbh, Fronius, 2 pages, May 18, 1997.

D.K. Aidun and S.A. Martin, "Penetration in Spot GTA Welds during Centrifugation," Journal of Material Engineering and Performance vol. 7(5), 4 pages, Oct. 1998—597.

Arc+ simulator; httl://www.123arc.com/en/depliant_ang.pdf; 2 pages, 2000.

Glen Wade, "Human uses of ultrasound: ancient and modern", Ulrasonics vol. 38, 5 pages, dated 2000.

ASME Definitions, Consumables, Welding Positions, 4 pages, dated Mar. 19, 2001. See http://www.gowelding.com/asme4.htm.

M. Abbas, F. Waeckel, Code Aster (Software) EDF (France), 14 pages, Oct. 2001.

(56) References Cited

OTHER PUBLICATIONS

Achim Mahrle, Jurgen Schmidt, "The influence of fluid flow phenomena on the laser beam welding process"; International Journal of Heat and Fluid Flow 23, 10 pages, dated 2002.
The Lindoln Electric Company; CheckPoint Production Monitoring brochure; four (4) pages; http://www.lincolnelectric.com/assets/en_US/products/literature/s232.pdf; Publication 82.32; 4 pages, Issue Date Feb. 2012.
G. Wang, P.G. Huang, and Y.M. Zhang; "Numerical Analysis of Metal Transfer in Gas Metal Arc Welding," Departments of Mechanical and Electrical Engineering. University of Kentucky, 10 pages, Dec. 10, 2001.
Desroches, X.; Code-Aster, Note of use for aciculations of welding; Instruction manual U2.03 booklet: Thermomechincal; Document: U2.03.05; 13 pages, Oct. 1, 2003.
Fast, K. et al., "Virtual Training for Welding", Mixed and Augmented Reality, 2004, ISMAR 2004, Third IEEE and SM International Symposium on Arlington, VA, 2 pages, Nov. 2-5, 2004.
Cooperative Research Program, Virtual Reality Welder Training, Summary Report SR 0512, 4 pages, Jul. 2005.
Porter, et al., Virtual Reality Training, Paper No. 2005-P19, 14 pages, 2005.
Eduwelding+, Weld Into the Future; Online Welding Seminar—A virtual training environment; 123arc.com; 4 pages, 2005.
Miller Electric Mfg Co.; MIG Welding System features weld monitoring software; NewsRoom 2010 (Dialog® File 992); © 2011 Dialog. 2010; http://www.dialogweb.com/cgi/dwclient?reg=133233430487; three (3) pages; printed Mar. 8, 2012.
M. Abida and M. Siddique, Numerical simulation to study the effect of tack welds and root gap on welding deformations and residual stresses of a pipe-flange joint, Faculty of Mechanical Engineering, GIK Institute of Engineering Sciences and Technology, Topi, NWFP, Pakistan, 12 pages, Available on-line Aug. 25, 2005.
Abbas, M. et al..; Code_Aster; Introduction to Code_Aster; User Manual; Booklet U1.0-: Introduction to Code_Aster; Document: U1.02.00; Version 7.4; 14 pages, Jul. 22, 2005.
Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, 8 pages, Apr. 1, 2006, pp. 294-300.
Nancy C. Porter, Edison Welding Institute; J. Allan Cote, General Dynamics Electric Boat; Timothy D. Gifford, VRSim; and Wim Lam, FCS Controls; Virtual Reality Welder Trainer, Sessiion 5: Joining Technologies for Naval Applications, 16 pages, earliest date Jul. 14, 2006 (http://weayback.archive.org).
T Borzecki, G. Bruce, Y.S. Han, M. Heinemann, A. Imakita, L. Josefson, W. Nie, D. Olson, F. Roland, and Y. Takeda, 16th International Shop and Offshore Structures Congress: Aug. 20-25, 2006: Southhampton, UK, 49 pages, vol. 2 Specialist Committee V.3 Fabrication Technology Committee Mandate.
Ratnam and Khalid: "Automatic classification of weld defects using simulated data and an MLP neutral network." Insight vol. 49, No. 3; 6 pages, Mar. 2007.
Wang et al., Study on welder training by means of haptic guidance and virtual reality for arc welding, 2006 IEEE International Conference on Robotics and Biomimetics, ROBIO 2006 ISBN-10: 1424405718, 5 pages, p. 954-958.
CS Wave, The Virtual Welding Trainer, 6 pages, 2007.
asciencetutor.com, A division of Advanced Science and Automation Corp., VWL (Virtual Welding Lab), 2 pages, 2007.
Eric Linholm, John Nickolls, Stuart Oberman, and John Montrym, "NVIDIA Testla: A Unifired Graphics and Computing Architecture", IEEE Computer Society, 17 pages, 2008.
NSRP ASE, Low-Cost Virtual Realtiy Welder Training System, 1 Page, 2008.
Edison Welding Institute, E-Weld Predictor, 3 pages, 2008.
CS Wave, A Virtual learning tool for welding motion, 10 pages, Mar. 14, 2008.
The Fabricator, Virtual Welding, 4 pages, Mar. 2008.
N. A. Tech., P/NA.3 Process Modeling and Optimization, 11 pages, Jun. 4, 2008.
FH Joanneum, Fronius—virtual welding, 2 pages, May 12, 2008.
Eduwelding+, Training Activities with arc+ simulator; Weld Into the Future, Online Welding Simulator—A virtual training environment; 123arc.com; 6 pages, May 2008.
ChemWeb.com, Journal of Materials Engineering and Performance (v.7, #5), 3 pgs., printed Sep. 26, 2012.
Choquet, Claude; "ARC+: Today's Virtual Reality Solution for Welders" Internet Page, 6 pages, Jan. 1, 2008.
Juan Vicenete Rosell Gonzales, "RV-Sold: simulator virtual para la formacion de soldadores"; Deformacion Metalica, Es. vol. 34, No. 301, 14 pages, Jan. 1, 2008.
White et al., Virtual welder training, 2009 IEEE Virtual Reality Conference, 1 page, p. 303, 2009.
Training in a virtual environment gives welding students a leg up, retrieved on Apr. 12, 2010 from: http://www.thefabricator.com/article/arcwelding/virtually-welding, 4 pages.
Sim Welder, retrieved on Apr. 12, 2010 from: http://www.simwelder.com, 2 pages.
P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/journal/sensors; 2009; 18 pages; Sensors 2009, 9, 7753-7770; doi; 10.3390/s91007753.
Production Monitoring 2 brochure, four (4) pages, The Lincoln Electric Company, May 2009.
International Search Report and Written Opinion from PCT/IB10/02913, 11 pages, dated Apr. 19, 2011.
Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.
J. Hu and Hi Tsai, Heat and mass transfer in gas metal arc welding. Part 1: the arc, found in ScienceDirect, International Journal of Heat and Mass Transfer 50 (2007), 14 pages, 833-846 Available on Line on Oct. 24, 2006 http://www.web.mst.edu/~tsai/publications/HU-IJHMT-2007-1-60.pdf.
M. Ian Graham, Texture Mapping, Carnegie Mellon University Class 15-462 Computer Graphics, Lecture 10, 53 pages, dated Feb. 13, 2003.
Chuansong Wu: "Microcomputer-based welder training simulator", Computers in Industry, vol. 20, No. 3, Oct. 1992, 5 pages, pp. 321-325, XP000205597, Elsevier Science Publishers, Amsterdam, NL.
ViziTech USA, retrieved on Mar. 27, 2014 from http://vizitechusa.com/, 2 pages.
Guu and Rokhlin ,Technique for Simultaneous Real-Time Measurements of Weld Pool Surface Geometry and Arc Force, 10 pages, Dec. 1992.
William T. Reeves, "Particles Systems—A Technique for Modeling a Class of Fuzzy Objects", Computer Graphics 17:3 pp. 359-376, 1983, 17 pages.
S.B. Chen, L. Wu, Q. L. Wang and Y. C. Liu, Self-Learning Fuzzy Neural Networks and Computer Vision for Control of Pulsed GTAW, 9 pages, dated May 1997.
Patrick Rodjito, Position tracking and motion prediction using Fuzzy Logic, 81 pages, 2006, Colby College.
D'Huart, Deat, and Lium; Virtual Environment for Training, 6th International Conference, ITS 20002, 6 pages, Jun. 2002.
Konstantinos Nasios (Bsc), Improving Chemical Plant Safety Training Using Virtual Reality, Thesis submitted to the University of Nottingham for the Degree of Doctor of Philosophy, 313 pages, Dec. 2001.
ANSI/AWS D 10.11 Mid 10. 11 :2007 Guide for Root Pass Welding of Pipe without Backing Edition: 3rd American Welding Society / Oct. 13, 2006/36 pages. ISBN: 0871716445, 6 pages.
M. Jonsson, L. Karlsson, and L-E Lindgren, Simulation of Tack Welding Procedures in Butt Joint Welding of Plates Welding Research Supplement, Oct. 1985, 7 pages.
Isaac Brana Veiga, Simulation of a Work Cell in the IGRIP Program, dated 2006, 50 pages.

(56) References Cited

OTHER PUBLICATIONS

Balijepalli, A. and Kesavadas, Haptic Interfaces for Virtual Environment and Teleoperator Systems, Haptics 2003, 7-.,Department of Mechanical & Aerospace Engineering, State University of New York at Buffalo, NY.

Johannes Hirche, Alexander Ehlert, Stefan Guthe, Michael Doggett, Hardware Accelerated Per-Pixel Displacement Mapping, 8 pages.

Yao et al., 'Development of a Robot System for Pipe Welding'. 2010 International Conference on Measuring echnology and Mechatronics Automation. Retrieved from the Internet: http://ieeexplore.ieee.org/stamp/stamp.jsp?tp=&arnumber=5460347&tag=1; pp. 1109-1112, 4 pages.

Steve Mann, Raymond Chun Bing Lo, Kalin Ovtcharov, Shixiang Gu, David Dai, Calvin Ngan, Tao Ai, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE),pp. 1-6, 6 pages, Apr. 29, 2012.

Kyt Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmet-prototypes-how-awesome-the-technology-can-get/,1 page, retrieved on Sep. 26, 2014.

Terrence O'Brien, "Google's Project Glass gets some more details",Jun. 27, 2012, Retrieved from the Internet: http://www.engadget.com/2012/06/27/googles-project-glass-gets-some-more-details/, 1 page, retrieved on Sep. 26, 2014.

T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.

G. Wang, P.G. Huang, and Y.M. Zhang: "Numerical Analysis of Metal Transfer in Gas Metal Arc Welding": Departments of Mechanical Engineering; and Electrical and Computer Engineering, University of Kentucky, Lexington, KY 40506-0108, 10 pages, Dec. 10, 2001.

1400

| | WELD CONDITION | FIXED? | $ COST | TIME COST | WELD SCORE |
|---|---|---|---|---|---|
| 1404 | WIRE COMPOSITION | YES | N/A | N/A | |
| 1406 | WORKPIECE COMPOSITION | YES | N/A | N/A | |
| 1408 | SHIELDING GAS FLOW RATE | NO | d | e | f |
| 1410 | SHIELDING GAS COMPOSITION | YES | N/A | N/A | |
| 1412 | WORKPIECE PRE-HEAT TEMPERATURE | YES | N/A | N/A | |
| | | | | | |
| | | | | | |

Columns: 1402, 1414, 1418, 1420, 1416

FIG. 14B

SYSTEMS, METHODS, AND APPARATUSES FOR MONITORING WELD QUALITY

RELATED APPLICATIONS

The present application is being filed as a continuation-in-part (CIP) patent application claiming priority to and the benefit of U.S. patent application Ser. No. 13/453,124, filed on Apr. 23, 2012, which is a continuation-in-part of U.S. patent application Ser. No. 12/775,729, now U.S. Pat. No. 8,569,646, filed on May 7, 2010, which claims priority to and the benefit of U.S. Provisional Patent Application No. 61/261,079 filed on Nov. 13, 2009, the entire disclosures of which are incorporated herein by reference.

TECHNICAL FIELD

The general inventive concepts relate to electric arc welding and, more particularly, to systems, methods, and apparatuses for monitoring variables during a welding process and weighting the variables accordingly, quantifying weld quality, obtaining and using data indicative of a good weld, improving production and quality control for an automated welding process, teaching proper welding techniques, identifying cost savings for a welding process, and deriving optimal welding settings to be used as pre-sets for different welding processes or applications.

BACKGROUND

Many different conditions and parameters contribute to the overall quality of a resulting weld. Consequently, manufacturers of electric arc welders have attempted to monitor operation of the welder to determine the quality of the weld and the efficiency of the welder during operation in a manufacturing facility. One attempt to monitor an electric arc welder is illustrated in U.S. Pat. No. 6,051,805 to Vaidya (hereinafter "Vaidya") where a computer or other programmed instrument is employed to monitor average current and the efficiency of the welding operation, which efficiency is expressed as a ratio of the time welding is performed to the total time of the work shift. In accordance with standard technology, this disclosed monitoring system includes a first control circuit which is in the form of a central processing unit with standard accessories such as RAM and EPROM. A second control circuit is connected to the first circuit to input and output information during the monitoring procedure. The monitor gathers information over a period of time which is disclosed as extending over a few hours or up to 999 hours. The monitor determines welding efficiency and monitors time to determine average current and accumulated arc welding time for overall efficiency.

Vaidya discloses a capability of monitoring the current and wire feed speed, as well as gas flow during the welding procedure. All of this information is stored in appropriate memory devices for subsequent retrieval of the operating characteristics of the welder during the welding process. In this way, the productivity of the welder can be measured to calculate cost efficiency and other parameters. Monitoring of the electric arc welder, as suggested in Vaidya, has been attempted by other manufacturers to measure average current during a welding process. However, measuring average current, voltage, wire feed speed or other parameters during a welding process and using this data for recording the performance of the welding operation has not been satisfactory. In the past, monitoring devices have had no pre-knowledge of the parameters being monitored.

Consequently, monitoring of parameters such as current, voltage and even wire feed speed in the past, even using the technology set forth in Vaidya, has been chaotic in response and incapable of determining the actual stability of the electric arc or whether the welding process is above or below desired parameter values. This information must be known for the purpose of rejecting a welding cycle and/or determining the quality of the weld performed during the welding cycle with desired accuracy. In summary, monitoring the operation of an electric arc welder when used for a variety of welding processes has not been satisfactory because there is no prior knowledge which can be used for the purposes of evaluating the welding process during its implementation.

Overcoming these drawbacks, U.S. Pat. No. 6,441,342 to Hsu (hereinafter "Hsu") discloses a monitor and method of monitoring an electric arc welder as the welder performs a selected arc welding process that creates information on the operation of the welder. Accordingly, use of standard, high power computer technology can be used on equally precise and intelligent data generated by the monitor. The monitor and monitoring system of Hsu employs known information during the welding process. The information is fixed and not varying. The monitor concentrates on specific aspects of the welding process to employ prior knowledge which is compared to actual performance. Thus, the stability and acceptable magnitudes or levels of a selected parameter is determined during a specific aspect of the welding process. The weld process is separated into fixed time segments with known desired parameters before monitoring. Then this data can be processed by known computer techniques to evaluate aspects of the weld cycles.

Hsu discloses that the welding process is carried out by an electric arc welder generating a series of rapidly repeating wave shapes. Each wave shape constitutes a weld cycle with a cycle time. Each weld cycle (i.e., wave shape) is created by a known wave shape generator used to control the operation of the welder. These wave shapes are divided into states, such as in a pulse welding process, a state of background current, ramp up, peak current, ramp down, and then back to background current. By dividing the known driving wave shape into states defined as time segments of the generated arc characteristics, any selected one of the states can be monitored. Indeed, many states can be multiplexed. For instance, in the pulse welding process the state related to the peak current can be monitored. Hsu discloses that the state of the welding process is monitored by being read at a high rate preferably exceeding 1.0 kHz. Each of the actual welding parameters, such as current, voltage or even wire feed speed is detected many times during each peak current state of the wave shape used in the pulse welding process. In this manner, the ramp up, ramp down, and background current are ignored during the monitoring process of the peak current state.

Consequently, the peak current is compared with a known peak current. A function of the peak current can be used to detect variations in the actual peak current output from the electric arc welder. In Hsu, a minimum level and a maximum level on the lower and higher side of the command peak current are used to determine the level of the peak current many times during each peak current state of the pulse weld wave shape. Whenever the current exceeds the maximum, or is less than the minimum, this event is counted during each wave shape. The total deviations or events are counted for a weld time (i.e., a time during which a welding process or some significant portion thereof is carried out). If this count is beyond a set number per wave shape or during the weld time, a warning may be given that this particular welding process experienced unwanted weld conditions. Indeed, if the count exceeds a maximum level the weld is rejected. This same capability is used with a statistical standard deviation program to read the peak current many times during each peak current state of the wave shape to sense the magnitude of the standard deviation. In practice, the standard deviation is the root-mean-square (RMS) deviation calculation by the computer program. In Hsu, the average peak current is calculated and recorded as well as the level conditions and the stability characteristics. The RMS of the current or voltage is also determined for each of the states being monitored, for example, the peak current state of a pulse wave shape. While the peak current level or standard elevation is monitored, the background current stage can be monitored by current level and duration.

Hsu discloses selecting a state in the wave shape and comparing the desired and known command signals for that state to the actual parameters of the welding process during that monitored state. The selection is based on prior knowledge of the waveform generator. For example, at a specific wire feed speed WFS1, the waveform generator is programmed to adjust peak current to control arc length. The "informed" monitor then selects the peak current segment as the monitored state, when welding at this wire feed speed WFS1. At another wire feed speed WFS2, however, the waveform generator is programmed to adjust background time to control arc length (and not peak current). The "informed" monitor then selects the background time as the monitored state and parameter, when welding at this wire feed speed WFS2. In contrast, a posteriori monitor has no idea that at different wire feed speeds, different aspects of the waveform should be monitored to detect arc stability. Monitoring background time at wire feed speed WFS1 or monitoring peak current at wire feed speed WFS2, in this example, would be very ineffective. Thus, Hsu discloses using a time segment of the wave shape for monitoring this segment of the wave shape using prior knowledge of the desired values. This allows actual monitoring of the electric arc welding process and not merely an averaging over the total wave shape.

In Hsu, the monitor is characterized by the use of prior knowledge, as opposed to the normal process of merely reading the output parameters experienced during the welding process. Consequently, the monitoring greatly simplifies the task of detecting normal behavior of a welder when the normal behavior is a function of time and differs during only one aspect of the welding process. The teachings of Hsu are not as applicable to monitoring voltage in a constant voltage process, because the desired level of voltage is a known characteristic during the total weld cycle. However, in other welding processes when both the voltage and current vary during different segments of the wave shape, the method of Hsu gives accurate readings of stability, RMS, standard deviation, average, below minimum and above maximum before the actual parameter being monitored during selected segments of the wave shape.

According to Hsu, the time varying welding processes, such as pulse welding and short circuit welding, are monitored with precise accuracy and not by reading general output information. The monitor is activated at a selected time in each wave form which is the selected state or segment of the wave shape. The monitor compares actual parameters to the desired parameters in the form of command signals directed to a power supply of the welder. In Hsu, monitoring can occur during only specific segments of the wave shape; however, in exceptional events, such as when the arc is extinguished or when there is a short circuit, a computerized subroutine is implemented by either voltage sensing or current sensing to restart the arc and/or correct the short. The subroutines for these events run parallel to the monitoring program. Consequently, these exceptions do not affect the overall operation of the monitor. These subroutines are constructed as exceptional states or time segments. The parameters or signals within these exceptional states are monitored in a similar fashion as described above.

In Hsu, production information over a calendar time, shift or even by operator can be accumulated for the purposes of evaluating the operation or efficiency of a welder. The monitoring of each weld cycle by monitoring a specific segment or state of the wave shape allows accumulation of undesired events experienced over time. This also allows a trend analysis so that the operator can take corrective actions before the welding process actually produces defective production welds. Trend analysis, defect analysis, accumulated defects, logging of all of these items and related real time monitoring of the electric arc welder allows direct intervention in a timely manner to take preventive actions as opposed to corrective actions.

SUMMARY

The general inventive concepts contemplate systems, methods, and apparatuses for monitoring variables during a welding process and weighting the variables accordingly, quantifying weld quality, obtaining and using data indicative of a good weld, detecting weld defects, and diagnosing possible causes of the weld defects. The weld quality data allows for improvements in production and quality control for an automated welding process, teaching proper welding techniques, identifying cost savings for a welding process, and deriving optimal welding settings to be used as pre-sets for different welding processes or applications. By way of example to illustrate various aspects of the general inventive concepts, several exemplary systems, methods, and are disclosed herein.

A method of monitoring an electric arc welder as the welder performs a selected arc welding process by creating actual welding parameters between an advancing wire and a workpiece, the selected process controlled by command signals to a power supply of the welder, according to one exemplary embodiment, is disclosed. The method includes (a) generating a series of rapidly repeating wave shapes, each wave shape constituting a weld cycle with a cycle time; (b) dividing the wave shapes into states; (c) measuring a selected weld parameter occurring in one of the wave shape states at an interrogation rate over a period of time to obtain a data set for the selected weld parameter; (d) for each period of time, calculating a stability value for the selected weld parameter from the data set; (e) comparing each stability value to an expected stability value to determine if a difference between the stability value and the expected stability value exceeds a predetermined threshold; and (f) if the difference exceeds the threshold, weighting the stability value with a magnitude weight based on the difference, and weighting the stability value with a time contribution weight based on a time contribution of the wave shape state to its wave shape. In this manner, the method can assign multiple weights (e.g., based on a degree/magnitude of deviation and a time contribution of its state) to a measured parameter (i.e., an item in the data set) that constitutes an outlier. In one exemplary embodiment, an outlier is defined as a measured value for a weld parameter that falls outside the limit of three (3) standard deviations away from the mean value of the weld parameter. A monitor, integrated with an arc welder, for performing this exemplary method is also contemplated.

A method of quantifying a weld's quality by monitoring an electric arc welder as the welder performs a selected arc welding process by creating actual welding parameters between an advancing wire and a workpiece, the selected process controlled by command signals to a power supply of the welder, according to one exemplary embodiment, is disclosed. The method includes: (a) generating a series of rapidly repeating wave shapes, each wave shape constituting a weld cycle with a cycle time; (b) dividing the wave shapes into states; (c) measuring a plurality of selected weld parameters occurring in one or more of the states at an interrogation rate over a period of time repeatedly during a weld time; and (d) calculating a plurality of quality parameters for each of the states based on the measurements of the selected weld parameters during the periods of time, wherein the quality parameters represent an overall quality measurement of the weld. A monitor, integrated with an arc welder, for performing this exemplary method is also contemplated.

In one exemplary embodiment, the method also includes: (e) comparing a value of each of the quality parameters calculated for each period of time to a corresponding expected quality parameter value to determine if a difference between the calculated quality parameter value and the expected quality parameter value exceeds a predetermined threshold; and (f) if the difference exceeds the threshold, weighting the calculated quality parameter value with a magnitude weight based on the difference, and weighting the calculated quality parameter value with a time contribution weight based on a time contribution of its state to the wave shape including the state. A monitor, integrated with an arc welder, for performing this exemplary method is also contemplated.

In one exemplary embodiment, the interrogation rate is 120 kHz. In one exemplary embodiment, the period of time is approximately 250 ms.

In one exemplary embodiment, the selected weld parameters include, for each of the states, a count of the measurements taken for each of the selected weld parameters in the period of time, a mean voltage voltage in the period of time, a root mean square voltage RMSV in the period of time, a voltage variance $V_{var}$ in the period of time, a mean current current in the period of time, a root mean square current RMSI in the period of time, and a current variance $I_{var}$ in the period of time, wherein voltage=a sum of voltages measured in the period of time/the count of voltage measurements, wherein $$RMSV = \sqrt{\frac{\sum_{i=1}^{N} (voltage_i)^2}{N}}$$

wherein $V_{var}$=RMSV−voltage, wherein current=a sum of currents measured in the period of time/the count of current measurements, wherein $$RMSI = \sqrt{\frac{\sum_{i=1}^{N} (current_i)^2}{N}}$$

and wherein $I_{var}$=RMSI−current.

In one exemplary embodiment, the quality parameters include a quality count average QCA for each state calculated as:

$$QCA = \frac{\sum_{i=1}^{N} count_i}{N}$$

wherein N is the total number of weld cycles in a period of time, and wherein count.sub.i refers to a count of the measurements for a specific one of the weld cycles in the period of time.

In one exemplary embodiment, the quality parameters include a quality count standard deviation QCSD for each state calculated as:

$$QCSD = \frac{\sum_{i=1}^{N} (count_i - QCA)^2}{N - 1}$$

In one exemplary embodiment, the quality parameters include a quality count standard deviation QCSD for each state calculated as:

$$QCSD = \frac{\sum_{i=1}^{N} (count_i - QCA)^2}{N}$$

In one exemplary embodiment, the quality parameters include a quality voltage average QVA for each state calculated as:

$$QVA = \frac{\sum_{i=1}^{N} voltage_i}{N}$$

wherein N is the total number of weld cycles in the period of time, and wherein voltage, refers to a voltage measurement for a specific one of the weld cycles in the period of time.

In one exemplary embodiment, the quality parameters include a quality voltage standard deviation QVSD for each state calculated as:

$$QVSD = \frac{\sum_{i=1}^{N} (voltage_i - QVA)^2}{N - 1}$$

In one exemplary embodiment, the quality parameters include a quality voltage standard deviation QVSD for each state calculated as:

$$QVSD = \frac{\sum_{i=1}^{N} (voltage_i - QVA)^2}{N}$$

In one exemplary embodiment, the quality parameters include a quality current average QIA for each state calculated as:

$$QIA = \frac{\sum_{i=1}^{N} \text{current}_i}{N}$$

wherein N is the total number of weld cycles in the period of time, and wherein current, refers to a current measurement for a specific one of the weld cycles in the period of time.

In one exemplary embodiment, the quality parameters include a quality current standard deviation QISD for each state calculated as:

$$QISD = \sqrt{\frac{\sum_{i=1}^{N} (\text{current}_i - QIA)^2}{N-1}}$$

In one exemplary embodiment, the quality parameters include a quality current standard deviation QISD for each state calculated as:

$$QISD = \sqrt{\frac{\sum_{i=1}^{N} (\text{current}_i - QIA)^2}{N}}$$

In one exemplary embodiment, the quality parameters include a quality voltage variance average QVVA for each state calculated as:

$$QVVA = \frac{\sum_{i=1}^{N} \text{Vvar}_i}{N}$$

wherein N is the total number of weld cycles in the period of time.

In one exemplary embodiment, the quality parameters include a quality voltage variance standard deviation QVVSD for each state calculated as:

$$QVVSD = \sqrt{\frac{\sum_{i=1}^{N} (\text{Vvar}_i - QVVA)^2}{N-1}}$$

In one exemplary embodiment, the quality parameters include a quality voltage variance standard deviation QVVSD for each state calculated as:

$$QVVSD = \sqrt{\frac{\sum_{i=1}^{N} (\text{Vvar}_i - QVVA)^2}{N}}$$

In one exemplary embodiment, the quality parameters include a quality current variance average QIVA for each state calculated as:

$$QIVA = \frac{\sum_{i=1}^{N} \text{Vvar}_i}{N}$$

wherein N is the total number of weld cycles in the period of time.

In one exemplary embodiment, the quality parameters include a quality current variance standard deviation QIVSD for each state calculated as:

$$QIVSD = \sqrt{\frac{\sum_{i=1}^{N} (\text{Ivar}_i - QIVA)^2}{N-1}}$$

In one exemplary embodiment, the quality parameters include a quality current variance standard deviation QIVSD for each state calculated as:

$$QIVSD = \sqrt{\frac{\sum_{i=1}^{N} (\text{Ivar}_i - QIVA)^2}{N}}$$

Similar quality parameters based on monitored wire feed speed (WFS) may also be calculated in a similar manner such as, for example, a quality wire feed speed average (QWA), a quality wire feed speed standard deviation (QWSD), a quality wire feed speed variance average (QWVA), and a quality wire feed speed variance standard deviation (QWVSD).

In one exemplary embodiment, the method further includes: (e) using the quality parameters in a metric to evaluate subsequent welds. A monitor, integrated with an arc welder, for performing this exemplary method is also contemplated.

A method of evaluating a plurality of welds performed under substantially the same conditions and according to substantially the same arc welding process by monitoring an electric arc welder as the welder performs the welds according to the arc welding process by creating actual welding parameters between an advancing wire and a workpiece, the selected process controlled by command signals to a power supply of the welder, according to one exemplary embodiment, is disclosed. The method includes, during each weld: (a) generating a series of rapidly repeating wave shapes, each wave shape constituting a weld cycle with a cycle time; (b) dividing the wave shapes into states; (c) measuring a selected weld parameter occurring in one of the states at an interrogation rate over a period of time to obtain a data set for the selected weld parameter; (d) for each period of time, calculating a quality value for the selected weld parameter from the data set; (e) comparing each quality value to an expected quality value to determine if a difference between the quality value and the expected quality value exceeds a predetermined threshold; (f) if the difference exceeds the threshold, weighting the quality value with a magnitude weight based on the difference, and weighting the quality value with a time contribution weight based on a time contribution of the state to its wave shape; and (g) using all of the quality values, including any weighted quality values, obtained during the weld time to determine a quality score for the weld.

In one exemplary embodiment, the method further includes: (h) rejecting the weld if its quality score is within a first predefined range of quality scores; and (i) accepting the weld if its quality score is within a second predefined range of quality scores.

In one exemplary embodiment, the method further includes: (h) permanently associating each weld with its corresponding quality score.

In one exemplary embodiment, the interrogation rate is 120 kHz. In one exemplary embodiment, the period of time is approximately 250 ms.

In one exemplary embodiment, the selected weld parameter is arc current. In one exemplary embodiment, the selected weld parameter is arc voltage.

A method of providing instruction to an individual (i.e., an operator) manually performing an arc welding process using an electric arc welder including an integrated monitor, the welder performing the arc welding process by creating actual welding parameters between an advancing wire and a workpiece, the monitor capable of monitoring the actual welding parameters, and the arc welding process controlled by command signals to a power supply of the welder, according to one exemplary embodiment, is disclosed. The method includes: (a) generating a series of rapidly repeating wave shapes, each wave shape constituting a weld cycle with a cycle time; (b) dividing the wave shapes into states; (c) measuring a selected weld parameter occurring in one of the states at an interrogation rate over a period of time to obtain a data set for the selected weld parameter; (d) for each period of time, calculating a quality value for the selected weld parameter from the data set; (e) comparing each quality value to an expected quality value to determine if a difference between the quality value and the expected quality value exceeds a predetermined threshold; (f) if the difference exceeds the threshold, weighting the quality value with a magnitude weight based on the difference, and weighting the quality value with a time contribution weight based on a time contribution of the state to its wave shape; (g) using the quality value, including any weights, to update a current aggregate quality score for the weld; (h) determining if the current aggregate quality score is within a predefined range of acceptable quality scores during the welding process; and (i) if the current aggregate quality score is outside the predefined range of acceptable quality scores, providing information on corrective action to the operator.

In one exemplary embodiment, the interrogation rate is 120 kHz. In one exemplary embodiment, the period of time is approximately 250 ms.

In one exemplary embodiment, the information is provided visually. In one exemplary embodiment, the information is provided audibly.

In one exemplary embodiment, the information includes a suggested change in a position of the wire relative to the workpiece. In one exemplary embodiment, the information includes a suggested change in a rate of movement of the wire relative to the workpiece.

In one exemplary embodiment, the information is provided to the operator at a predetermined reporting rate. In one exemplary embodiment, the reporting rate is less than 30 seconds. In one exemplary embodiment, the reporting rate is greater than or equal to 30 seconds.

In one exemplary embodiment, the information is provided if recent changes in the current aggregate quality score indicate the current aggregate quality score is likely to move outside the predefined range of acceptable quality scores.

In one exemplary embodiment, the method further includes: (j) if the current aggregate quality score is within the predefined range of acceptable quality scores, providing confirmation to the operator that no corrective action is necessary.

A method of evaluating a plurality of operators performing an arc welding process by monitoring an electric arc welder associated with each of the operators, as each welder is used by its respective operator to perform said arc welding process by creating actual welding parameters between an advancing wire and a workpiece with said arc welding process controlled by command signals to a power supply of said welder, is disclosed. The method includes, for each operator: (a) generating a numerical score indicating a quality measurement of a weld formed according to said arc welding process relative to a predetermined baseline weld; (b) measuring an amount of time said operator spends performing said arc welding process; and (c) associating said numerical score and said welding time with said operator.

In one exemplary embodiment, the numerical score is generated by: (a1)) generating a series of rapidly repeating wave shapes, each wave shape constituting a weld cycle with a cycle time; (a2) dividing said wave shapes into states; (a3) measuring a selected weld parameter occurring in one of said states at an interrogation rate over a period of time to obtain a data set for said selected weld parameter; (a4) for each period of time, calculating a quality value for said selected weld parameter from said data set; (a5) comparing each quality value to an expected quality value to determine if a difference between said quality value and said expected quality value exceeds a predetermined threshold; (a6) if said difference exceeds said threshold, weighting said quality value with a magnitude weight based on said difference, and weighting said quality value with a time contribution weight based on a time contribution of said state to its wave shape; and (a7) using all of said quality values, including any weighted quality values, obtained during said arc welding process to determine said numerical score.

A method of performing a cost-effective analysis for a selected arc welding process, wherein an electric arc welder performs the arc welding process by creating actual welding parameters between an advancing wire and a workpiece, the selected process controlled by command signals to a power supply of the welder, according to one exemplary embodiment, is disclosed. The method includes: (a) identifying a plurality of weld conditions capable of affecting overall weld quality; (b) varying one of the weld conditions across a plurality of welds and fixing all remaining weld conditions across the welds; (c) for each of the welds: (i) generating a series of rapidly repeating wave shapes, each wave shape constituting a weld cycle with a cycle time; (ii) dividing the wave shapes into states; (iii) measuring a selected weld parameter occurring in one of the states at an interrogation rate over a period of time to obtain a data set for the selected weld parameter; (iv) for each period of time, calculating a stability value for the selected weld parameter from the data set; (v) comparing each stability value to an expected stability value to determine if a difference between the stability value and the expected stability value exceeds a predetermined threshold; (vi) if the difference exceeds the threshold, weighting the stability value with a magnitude weight based on the difference, and weighting the stability value with a time contribution weight based on a time contribution of the wave shape state to its wave shape; (vii)

using the stability values obtained during the weld time, including any weighted stability values, to calculate an overall quality score for the weld; (viii) determining a cost for the weld; and (ix) associating the quality score and the cost with the weld.

In one exemplary embodiment, the weld conditions include one or more of wire characteristics, workpiece characteristics, a shielding gas flow rate, a shielding gas composition, and a workpiece pre-heat temperature.

In one exemplary embodiment, the cost includes monetary expenditures related to producing the weld. In one exemplary embodiment, the cost includes a total time required to complete the weld.

In one exemplary embodiment, the stability value is a standard statistical deviation for the selected weld parameter.

In one exemplary embodiment, the interrogation rate is 120 kHz. In one exemplary embodiment, the period of time is approximately 250 ms.

In one exemplary embodiment, the method further includes: (d) outputting the quality score and the cost (or respective averages thereof) associated with each of the welds.

A method of using pre-set welding parameters to obtain a weld having a desired quality, the weld produced by an electric arc welder performing a selected arc welding process by creating actual welding parameters between an advancing wire and a workpiece, the welding process controlled by command signals to a power supply of the welder, according to one exemplary embodiment, is disclosed. The method includes: (a) presenting a plurality of sets of selected weld parameters to a user along with a quality score corresponding to each set, wherein the quality score quantifies an overall quality of a weld previously obtained using the set of selected weld parameters; (b) receiving input from the user as to which of the sets of selected weld parameters to use for performing the welding process; and (c) performing the welding process using the set of selected weld parameters corresponding to the input.

In one exemplary embodiment, a cost associated with performing the welding process using each of the sets of selected weld parameters is presented to the user.

In one exemplary embodiment, the method further includes: (d) receiving input from the user identifying a minimum acceptable quality score; and (e) filtering out all sets of selected weld parameters that correspond to an associated quality score below the minimum acceptable quality score.

In one exemplary embodiment, the method further includes: (d) receiving input from the user identifying a range of acceptable quality scores; and (e) filtering out all sets of selected weld parameters that correspond to an associated quality score outside of the range of acceptable weld quality scores.

In one exemplary embodiment, a method of diagnosing an arc welding process by monitoring an electric arc welder as the welder performs the arc welding process by creating actual welding parameters between an advancing wire and a workpiece to create a weld is disclosed. The welding process is controlled by command signals to a power supply of the welder. The method includes generating a series of rapidly repeating wave shapes, each wave shape constituting a weld cycle with a cycle time, and dividing the wave shapes into states. The method further includes measuring a plurality of weld parameters occurring in one or more of the states at an interrogation rate over a period of time repeatedly during the welding process. The method also includes calculating a plurality of quality parameters for each of the one or more states based on the measurements of the weld parameters during the welding process. The method further includes analyzing at least one of the plurality of quality parameters and the plurality of weld parameters to diagnose the arc welding process by determining one or more possible causes of one or more localized or continuous defects of the weld.

The method may further include comparing a value of each of the quality parameters calculated for each period of time to a corresponding expected quality parameter value to determine if a difference between the calculated quality parameter value and the expected quality parameter value exceeds a predetermined threshold. If the difference exceeds the threshold, the method also includes weighting the calculated quality parameter value with a magnitude weight based on the difference, and weighting the calculated quality parameter with a time contribution weight based on a time contribution of its state to the wave shape including the state.

In one exemplary embodiment, a system for diagnosing an arc welding process by monitoring an electric arc welder as the welder performs the arc welding process by creating actual welding parameters between an advancing wire and a workpiece to create a weld is disclosed. The welding process is defined by a series of rapidly repeating wave shapes controlled by command signals to a power supply of the welder. The system includes a logic state controller for segmenting the wave shapes into a series of time segmented states and a circuit for selecting a specific wave shape state. The system further includes monitoring devices for monitoring a plurality of weld parameters occurring in one or more of the states at an interrogation rate over a period of time repeated during the welding process to obtain a data set for the plurality of weld parameters. The system also includes a circuit for calculating a plurality of quality parameters for each of the states based on the monitored plurality of weld parameters. The system further includes a diagnostic logic circuit for analyzing at least one of the plurality of quality parameters and the plurality of weld parameters to diagnose the arc welding process by determining one or more possible causes of one more localized or continuous defects of the weld.

The system may further include a circuit for comparing a value of each of the quality parameters calculated for each period of time to a corresponding expected quality parameter value to determine if a difference between the calculated quality parameter value and the expected quality parameter value exceeds a predetermined threshold. The system may also include a circuit for weighting the calculated quality parameter value with a magnitude weight based on the difference, and weighting the calculated quality parameter value with a time contribution weight based on a time contribution of its state to the wave shape including the state, if the difference exceeds the threshold.

In one exemplary embodiment, a method of determining a quality of a weld by monitoring a welder as the welder performs a welding process by creating actual welding parameters between an advancing wire and a workpiece is provided. The welding process is defined by a series of rapidly repeating wave shapes controlled by command signals to a power supply of the welder. The method includes segmenting a wave shape, having a weld cycle with a cycle time, into a series of time-segmented states. The method also includes selecting a non-adaptive state from the series of time-segmented states. The non-adaptive state represents a segment of the wave shape where the command signals remain invariable under different weld conditions. The method further include measuring a plurality of weld parameters generated between the advancing wire and the workpiece during the non-adaptive state at an interrogation rate over an interval of time. In addition, the method includes calculating a plurality of quality parameters for the non-adaptive state based on measurements of the plurality of weld parameters acquired during the interval of time within the non-adaptive state.

In one exemplary embodiment, a system for determining a quality of a weld by monitoring a welder as the welder performs a welding process by creating actual welding parameters between an advancing wire and a workpiece. The welding process being defined by a series of rapidly repeating wave shapes controlled by command signals to a power supply of the welder. The system includes a logic state controller for segmenting a wave shape, having a weld cycle with a cycle time, into a series of time-segmented states. The system further includes a selection circuit for selecting a non-adaptive state from the series of time-segmented states. The non-adaptive state represents a segment of the wave shape where the command signals remain invariable under different weld conditions. The system also includes a monitor circuit configured to measure a plurality of weld parameters generated between the advancing wire and the workpiece during the non-adaptive state at an interrogation rate over an interval of time. In addition, the system includes a circuit for calculating a plurality of quality parameters for the non-adaptive state based on measurements of the plurality of weld parameters acquired during the interval of time within the non-adaptive state.

Numerous aspects of the general inventive concepts will become readily apparent from the following detailed description of exemplary embodiments, from the claims and from the accompanying drawings.

BRIEF DESCRIPTION OF THE DRAWINGS

The general inventive concepts as well as embodiments and advantages thereof are described below in greater detail, by way of example, with reference to the drawings in which:

FIGS. 14A and 14B are tables showing exemplary data used in a cost analysis for a welding process, according to one exemplary embodiment;

DETAILED DESCRIPTION

Figure 1:
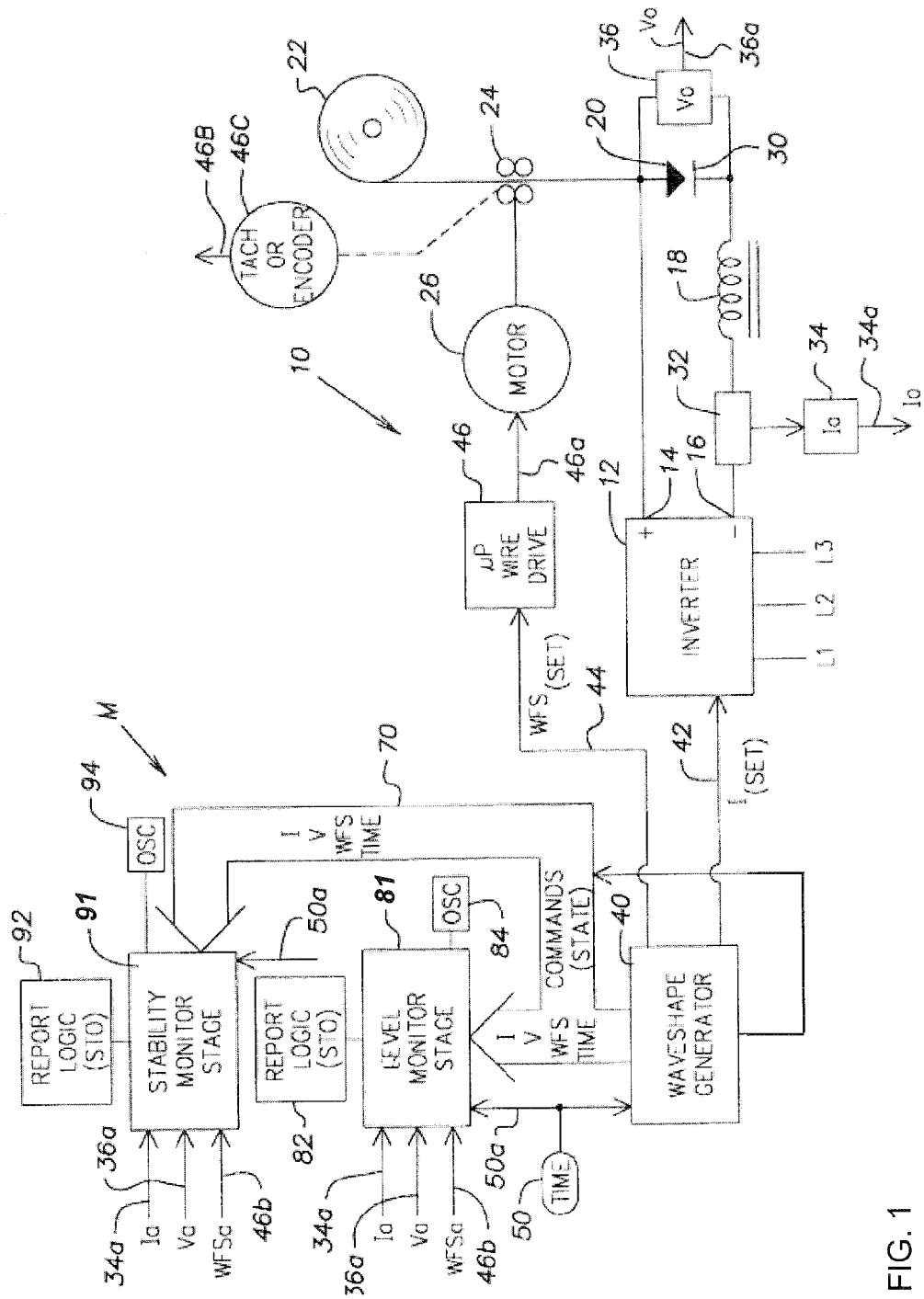
FIG. 1 is a combined block diagram and computer flow chart or program illustrating a monitor of an arc welder, according to one exemplary embodiment.

While the general inventive concepts are susceptible of embodiment in many different forms, there are shown in the drawings and will be described herein in detail specific embodiments thereof with the understanding that the present disclosure is to be considered as merely an exemplification of the principles of the general inventive concepts. Accordingly, the general inventive concepts are not intended to be limited to the specific embodiments illustrated herein. Furthermore, the disclosures of U.S. Pat. Nos. 5,278,390 and 6,441,342 are incorporated herein by reference, in their entirety, as they may provide background that facilitates a better understanding of particular aspects and/or advancements of the general inventive concepts.

The following are definitions of exemplary terms used throughout the disclosure. Both singular and plural forms of all terms fall within each meaning:

"Logic," synonymous with "circuit" as used herein includes, but is not limited to, hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. In some instances, logic could also be fully embodied as software.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing unit" as used herein includes, but is not limited to, any programmed or programmable electronic device that can store, retrieve, and process data.

Referring now to the drawings which illustrate various exemplary embodiments of the general inventive concepts and applications employing the general inventive concepts, FIG. 1 shows a block diagram and flow chart or program implemented by a standard onboard computer in electric arc welder 10. For example, welder 10 can be a Power Wave, inverter based electric arc welder sold by The Lincoln Electric Company of Cleveland, Ohio. In accordance with standard technology, welder 10 includes a three phase electrical input L1, L2, L3 directing electrical current to power supply 12. An onboard computerized controller operates the inverter based power supply to create a positive potential at terminal 14 and a negative potential at terminal 16.

Selected arc welding processes are performed by directing a selected previously determined wave shape to the actual welding circuit, shown to have a standard smoothing inductor 18. Welder 10 performs the electric arc welding process between an advancing welding wire 20 from reel 22 driven at a desired rate by feeder 24 operated at the speed of motor 26. Heat of the arc melts wire 20 and workpiece 30 to deposit molten metal from the wire onto the workpiece. To monitor the actual parameters of the welding process, shunt 32 (a monitoring device) provides output signal $I_a$ from block 34 on line 34a. This signal is representative of the actual arc current at any given time. In a like manner, the voltage between wire 20 and workpiece 30 is sensed by block 36 (a monitoring device) so the output $V_a$ on line 36a is the instantaneous arc voltage to constitute a second weld parameter. The weld parameters illustrated in FIG. 1 are the actual arc current $I_a$ and the actual arc voltage $V_a$.

Another parameter controlled for practicing the invention is wire feed speed (WFS), caused by rotation of the motor 26. Consequently, three externally readable welding parameters of the welding process are arc current $I_a$ in line 34a, arc voltage $V_a$ in line 36a and the wire feed speed WFS readable in line 46b, as explained later. The WFS in line 46b is read by tachometer or encoder 46c (a monitoring device) connected to the drive rolls 24 of the feeder gear box or, alternatively, on a passive wheel attached to the wire. In FIG. 1, the tachometer is shown as driven by the feed rolls. It could also be driven, for example, by the output shaft of motor 26.

The Power Wave electric arc welder includes a wave shape generator to create a series of rapidly repeating wave shapes, each wave shape (e.g., a single sequence of a voltage/current waveform) constituting a weld cycle with a cycle time. These weld cycles are repeated during the welding process to define a weld time. One embodiment of the Power Wave welder 10 is shown in U.S. Pat. No. 5,278,390 to Blankenship wherein the welder controls the individual wave shape to be output by power supply 12 through command line 42 and the speed of motor 26 through command line 44. Command line 44 has a signal which is recognized by the microprocessor on the wire drive control 46 of motor 26 to output the motor voltage drive PWM pulses in line 46a. In practice, the information on line 44 is digital and the command signal on line 46a is analog. Wave shape generator 40 creates digital signals in lines 42, 44 to controlling the desired welding process to be performed by welder 10. The external parameters $I_a$, $V_a$ and WFS can be read by appropriate monitoring devices.

The wave shape generator 40 divides or segments each of the output wave shapes into a series of time segmented portions or states. In one exemplary embodiment, monitor M is a program loaded into the computer of welder 10, among other things, to read parameters during one selected segment of the wave shape. The monitor M can be implemented using software, hardware, and combinations thereof, without departing from the spirit and the scope of the general inventive concepts. The portion of the wave shape being monitored is determined by the wave shape generator 40. Indeed, monitor M monitors various time segments or states of the wave shape output by generator 40. In practice, the wave shape generator 40 selects several of the time segments forming the wave shape and outputs the various states into a command interface 70. Consequently, the command interface 70 causes measurement of the parameters during selected time segments of each wave shape output by the generator. Information or data on the command interface 70 includes the state or states being monitored and the particular value or level of the various parameters $I_a$, $V_a$, and/or WFS.

Interface 70 of monitor M contains the data recognizing the particular state being processed together with the values for the weld parameters being read. The data in interface 70 is analyzed by level stage 81 to determine the relationship of a parameter on a level basis. The actual parameters are compared with trained or measured parameters during selected states of the wave shape from generator 40. During a particular segment or state of the wave shape, level monitor stage 81 reads the actual parameters in lines 34a, 36a and 46b. These instantaneous values of the actual parameters are stored in internal memory, identified as the report logic 82. The reading of the actual parameters occurs rapidly as indicated by oscillator 84. In one exemplary embodiment, reading of the actual parameters occurs at a rate of 120 kHz for pulse welding. The rate can be adjusted; however, the higher the rate the better the sensitivity of the level measurement. Level monitor 81 also determines a deviation of the actual welding parameters from either a minimum or maximum level. In this manner, not only can the actual values be stored, but data is stored representing deviation of the actual reading of the parameter for a given state as compared to a minimum level or to a maximum level. Report memory or logic 82 records deviation from a set level during a given state of the wave shape, as well as the actual level during the selected state of the wave shape. For a total weld cycle, these readings are accumulated, counted or otherwise processed to determine the quality of the weld and any trends toward weld defects.

In one exemplary embodiment, the readings (e.g., periodically accumulated sets of the readings) are weighted based on a plurality of criteria. The readings can be accumulated, for example, every 250 ms. In one exemplary embodiment, a set is weighted based on a magnitude of its deviation from an expected value (e.g., predetermined threshold, mean value) and a time contribution of its time segment to the corresponding wave shape. Such a weighting method (e.g., the weighting method 900 shown in FIG. 9 and described below) could be implemented, for example, in level monitor stage 81 or any similar or related data processing stage.

Stability monitor stage 91 reads the actual welding parameters on lines 34a, 36a and 46b at a rapid rate determined by oscillator 94. In one exemplary embodiment, reading of the actual parameters occurs at a rate of 120 kHz for pulse welding. Stability monitor stage 91 analyzes the actual weld parameters for standard deviation or absolute deviation during a state of the wave shapes being output. Report memory or logic 92 records this deviation during a given state of the wave shape, as well as the actual value during the selected state of the wave shape. For a total weld cycle, these readings are accumulated, counted or otherwise processed to determine the quality of the welding and any trends toward weld defects.

In one exemplary embodiment, the readings (e.g., periodically accumulated sets of the readings) are weighted based on a plurality of criteria. The readings can be accumulated, for example, every 250 ms. In one exemplary embodiment, a set is weighted based on a magnitude of its deviation from an expected value (e.g., predetermined threshold, mean value) and a time contribution of its time segment to the corresponding wave shape. Such a weighting method (e.g., the weighting method 900 shown in FIG. 9 and described below) could be implemented, for example, in stability monitor stage 91 or any similar or related data processing stage.

A few wave shapes can be skipped when using either monitor stage 81 or monitor stage 91. In one exemplary embodiment, after a start sequence, all of the wave shapes are monitored for analyzing the actual welding parameters during the various selected states of the wave shape. Several states of a given wave shape in a welding process are monitored and the results are recorded separately for each state to be analyzed for level conformity, trend and stability. When measuring stability, a standard deviation algorithm is used in monitor M to evaluate $I_a$, $V_a$ and/or WFS. This information is available to analyze each of the various segments of the wave shape forming a total weld cycle with a given cycle time. In practice, certain states, such as the peak current during a pulse wave shape are monitored to determine the stability and level deviations of the pulse welding process. In an STT welding process, monitor M records short circuit times for each wave shape, since these segments vary in time according to the external conditions of the welding process. Variation in short circuit time informs the welding engineer of adjustments to be implemented.

Figure 2:
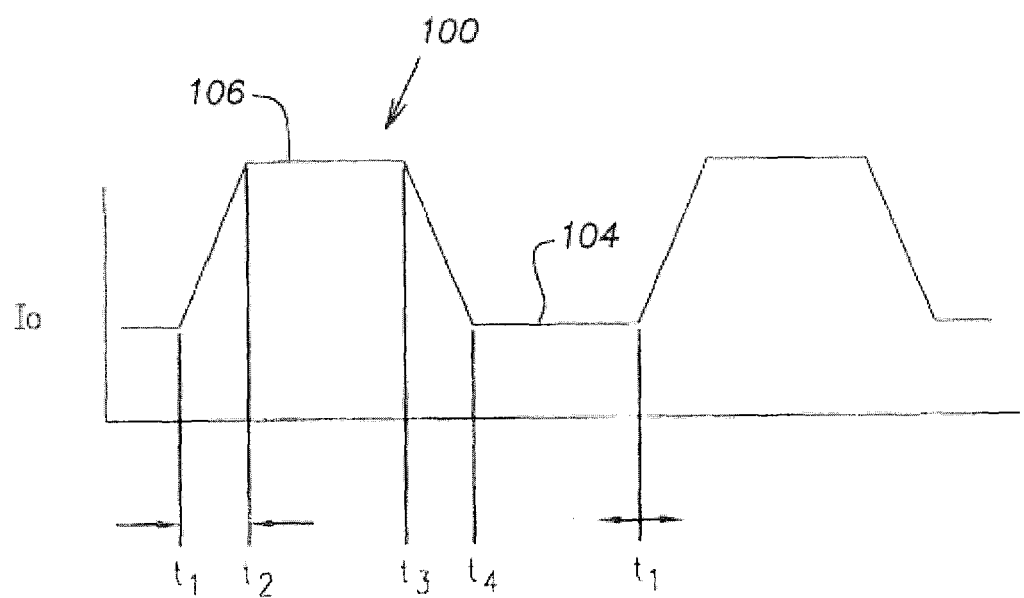
FIG. 2 is a current command graph from a wave generator showing the command wave shape divided into time segments or states of both fixed and variable durations, according to one exemplary embodiment.
Figure 3:
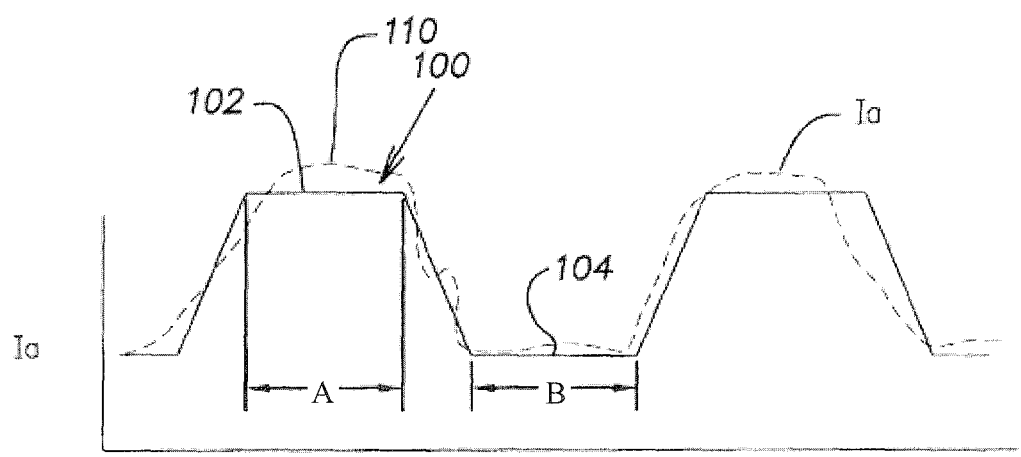
FIG. 3 is a current graph of the actual command signals for arc current with the actual arc current parameter superimposed in dashed lines, according to one exemplary embodiment.

The series of rapidly repeating wave shapes generated by the standard wave shape generator 40 are divided into time states, as shown in FIGS. 2 and 3. The output current command wave shape is pulse wave shape 100 with a peak current 102 having a fixed duration of time segment A shown in FIG. 3 and a background current 104 with a variable time duration for segment B shown in FIG. 3. The wave shape is divided into segments at times $t_1$-$t_4$ so that the command interface 70 receives the particular state being processed by generator 40 at any given time. As shown in FIG. 3 by the dashed line 110, the actual arc current from shunt 33 in FIG. 1 deviates from the command current signal of wave shape 100.

During the selected functional states, such as state A or state B, the actual arc current $I_a$ is read at a rate determined by oscillator 84 or oscillator 94. In practice, this is a single software oscillator. Level monitor stage 81 records deviation in the ordinate direction between the actual parameter 110 and the command level of wave shape 100. During the selected state, stability monitor stage 91 reads the statistical standard deviation of the actual parameter. States A and B are normally monitored for a pulse welding process. However, the ramp up state between $t_1$-$t_2$ and/or the ramp down state during $t_3$-$t_4$ can be monitored to control or at least read the activity of the actual parameter during these states of the wave shape. As illustrated, the background time segment B has a variable time, as shown by the variable time positions of time $t_1$. Consequently, the state being monitored can have a fixed time duration or a variable duration. When a variable duration, the state is monitored until the end of the duration. Report logic 82 senses this as a level from one time, i.e. $t_4$, to the successive time, i.e., $t_1$. As the time $t_1$ changes with respect to the time $t_4$, this time of each wave shape is recorded as a level which is compared to a known time, obtained from interface 70 by selection of the welding mode of generator 40.

Monitor M monitors the actual welding parameters during specific selected states of the wave shapes; however, the monitor also has programming to operate the computer to determine the stability and/or level characteristics of an internal signal, such as the actual input to motor 26 on line 46a. Such internal monitoring of the signal on line 46a is set forth in the flow chart shown in FIG. 4 utilizing the signals shown in FIG. 5.

The microprocessor in the wire feeder includes a subroutine that is a PID comparing network similar to an error amplifier. This PID comparator is schematically illustrated as block 152 in FIG. 4 having a first input 46b which is a wire feed speed WFS and a command signal on line 44. The actual WFS on line 46b is read by a tachometer or encoder connected to the drive rolls 24 of the feeder gear box or, alternatively, on a passive wheel attached to the wire to read the WFS. The output 156 of the PID is the voltage level at the input of the pulse width modulator 158 which is digitized in the microprocessor of the feeder. The output of the pulse width modulator is the command signal on line 46a to motor 26 for controlling the wire feed speed of feeder 24.

Figure 4:
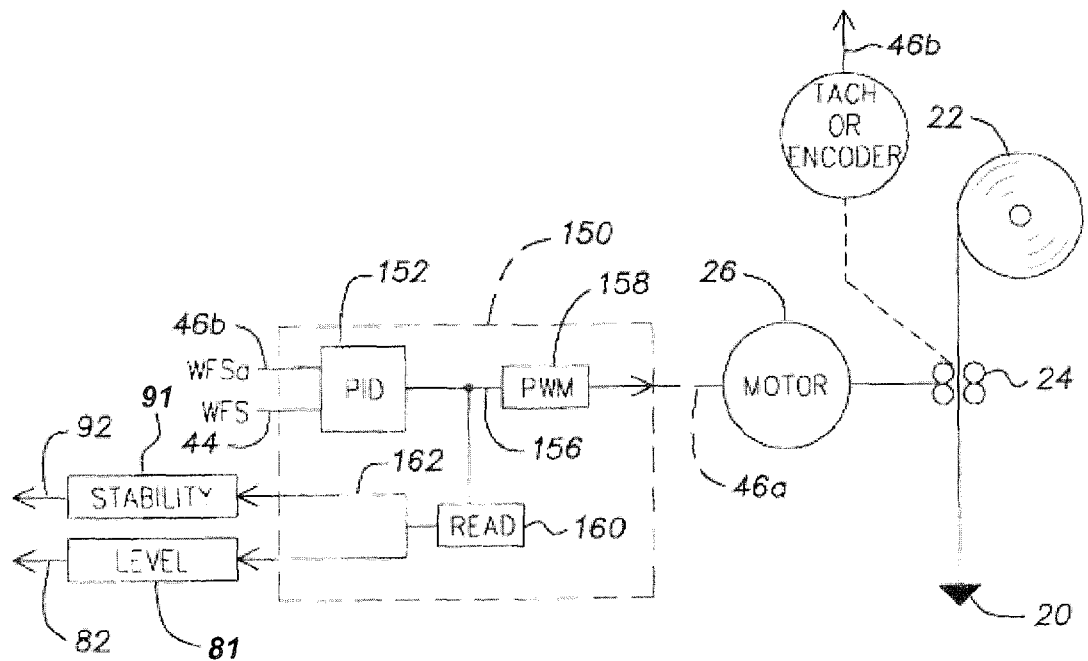
FIG. 4 is a block diagram of an aspect of the invention for monitoring signals internal of the welder instead of weld parameters as illustrated in FIGS. 2 and 3, according to one exemplary embodiment.

In accordance with one exemplary embodiment, monitor M includes the process program as schematically illustrated in FIG. 4 wherein the signal on line 156 is read by processing block 160 and the results are output on line 162 to the input of the level monitor stage 81 and/or the stability monitor stage 91, as previously discussed with respect to the embodiment shown in FIG. 1. Consequently, an internal signal on line 156 is read at a rapid rate, exceeding 1 kHz, to check the level of this internal signal and/or the stability of this signal.

Figure 5:
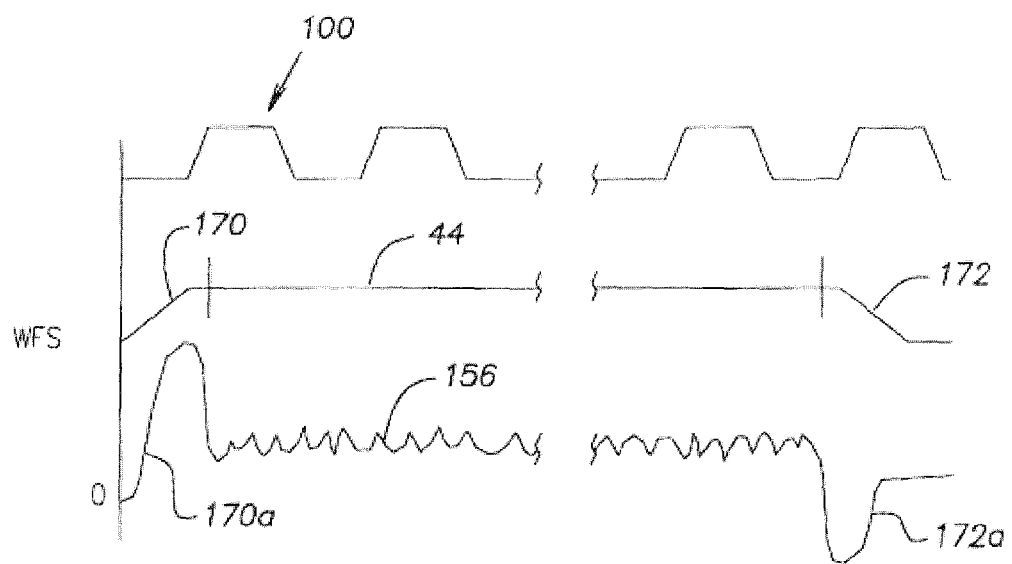
FIG. 5 is a time based graph illustrating the wave shape, wire feeder command signal and actual wire feeder command signal as experienced in the exemplary embodiment shown in FIG. 4.

As illustrated in FIG. 5, the wave shape 100 for pulse welding extends as a succession of wave shapes from generator 40. With respect to the wire feed speed, the command signal from generator 40 on line 44 takes the form shown in FIG. 5. It includes a start ramp up portion 170 and an ending ramp down portion 172. These two portions cause a drastic increase or decrease in the command signal on line 44. Between these abnormal command portions of the signal on line 44, there is a generally level wire feed speed command which is employed for the purposes of testing stability and/or the level deviation of this internal signal on line 156. In FIG. 5, the wire acceleration portion 170 is held until the speed is stabilized. This time is also monitored. Other internal signals can be monitored using the same concept as shown in FIGS. 4 and 5. The level monitor stage determines if the signal on line 156 exceeds the minimum or maximum for a prolonged time. For the wire feeder, this normally indicates a jam in the feeder system.

Figure 6:
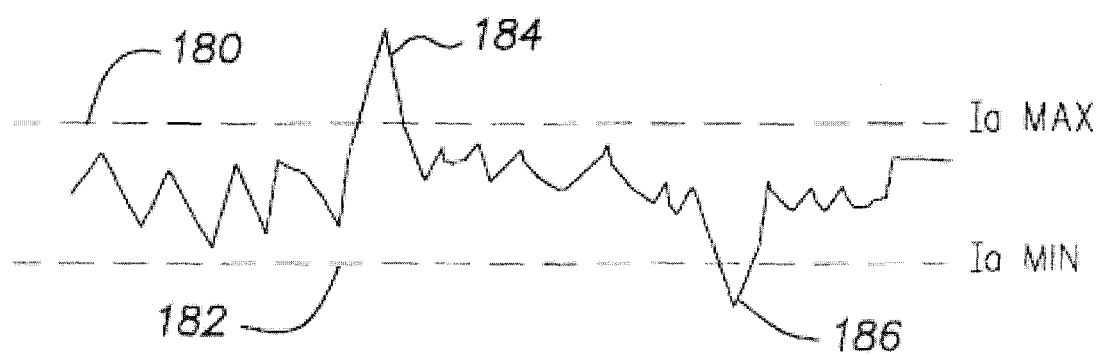
FIG. 6 is a portion of a parameter curve illustrating a level monitoring feature, according to one exemplary embodiment.

FIG. 6 shows the concept of a level monitor stage wherein threshold 180 is the maximum parameter level and threshold 182 is the minimum parameter level. When the parameter, illustrated as arc current, exceeds threshold 180 as indicated by transient 184, there is a recorded event of over current. In a like manner, when the current is less than the minimum level 182, as shown by transient 186, there is recorded an under current event. Additionally, these events can be weighted based on a plurality of criteria. In one exemplary embodiment, each event is weighted based on a magnitude of its deviation from an expected value (e.g., predetermined threshold, mean value) and a time contribution of its time segment to the corresponding wave shape. Such a weighting method (e.g., the weighting method 900 shown in FIG. 9 and described below) could be implemented, for example, in level monitor stage 81, stability monitor stage 91, or any similar or related data processing stage.

The weighted events are counted or otherwise accumulated periodically to provide the output of the level monitor stage 81 as shown in FIG. 1. The weighted events can be accumulated, for example, every 250 ms. Consequently, the level monitor stage 81 detects excursions 184 above a preset threshold and excursions 186 below a preset level. These levels are set by the particular state in the interface 70. Some states of a wave shape employ the level monitor stage 81 with thresholds and other states of the same wave shape may use the stability monitor stage 91. Preferably, and in practice, both monitor stages are used for the selected state or states of the wave shape being interrogated by monitor M.

Figure 7:
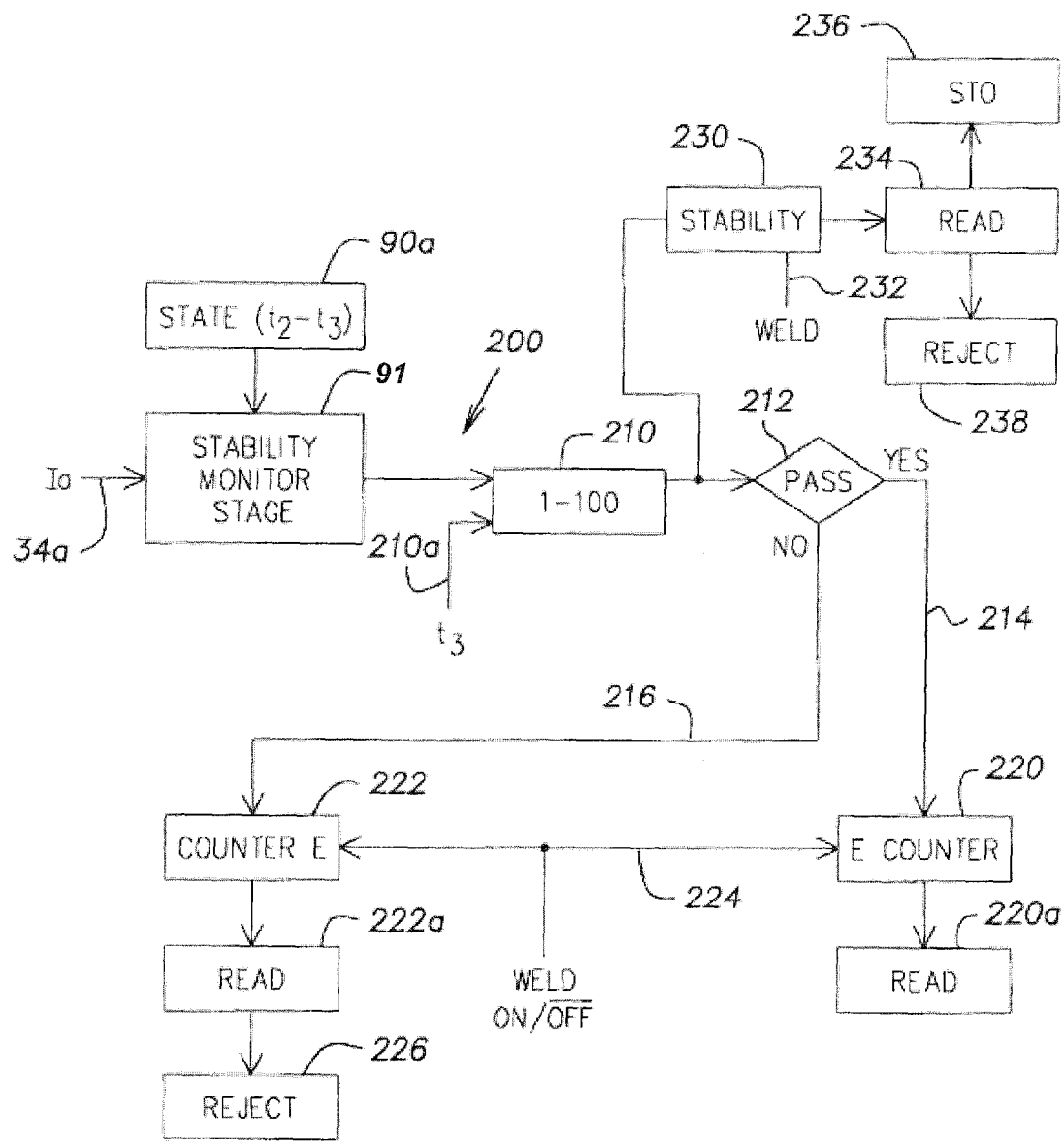
FIG. 7 is a block diagram and computer flow chart or program illustrating processing for stability during a selected state of the wave shape shown in FIGS. 2 and 3, according to one exemplary embodiment.

The embodiment shown in FIG. 1 monitors the level and/or stability of actual parameters for internal control signals during a selected state of the wave shape from generator 40 or during the total weld as explained in relationship to the disclosure in FIGS. 4 and 5. The monitor M in FIG. 1, as so far explained, provides weighted data for use in analyzing the weld cycle or the total operation of the welder over a work period of time. Various analysis programs are used to process data after the data has been determined and stored. In accordance with one exemplary embodiment, the weighted stability data from monitor stage 91 is analyzed by two programs as shown in FIG. 7. It is within the skill of the art to analyze the stability data in a variety of computer programs for recording, display and process intervention or evaluation.

As shown in FIG. 7, analysis program 200 uses the results of monitor stage 91 of monitor M (i.e., the weighted stability values). As an example, the program 200 is operated during monitoring of the time state between times $t_2$-$t_3$, which is the current peak portion of the wave shape as shown in FIGS. 2 and 3. Analysis program 200 is shown as a computer flow chart showing two systems employed to analyze the results of the stability stage 91 during the peak current state where the statistical standard deviation of actual current in line 34a is calculated. In practice, there is a slight delay before the monitor stage 91 makes calculated deviations. The sample select feature to read $I_a$ during state $t_2$-$t_3$ but ignore $I_a$ otherwise is illustrated as sample selector or filter 90a. This program delay at the start of time segment $t_2$-$t_3$ incorporated in filter 90a allows the monitor to ignore fluctuations in the current which are experienced during each level shift in the various stages of the output wave shape.

In the programmed flow chart shown in FIG. 7, the stability output from monitor stage 91 is read by the computer program shown as block 210 which is reset as indicated by the logic on line 210a at the end of each wave shape determined by the existence of time $t_3$. Consequently, the stability of each wave shape is captured by block 210. This captured stability data is processed in accordance with two separate analysis programs.

The first program includes the pass analysis routine 212. If the stability for a given wave shape passes the desired threshold set in block 212, this information is output on line 214. If the particular wave shape has a stability less than a desired threshold, a logic signal appears in line 216. Counters 220, 222 are enabled by the logic on line 224 during each of the weld cycles. Consequently, the stability pass signals for each of the wave shapes during the weld cycle are counted in either counter 220 or counter 222. Of course, the first portion of each state $t_2$-$t_3$ is ignored to allow the parameter $I_a$ to settle. The results of the two counters are read, stored or otherwise retained as indicated by the read block 220a, 222a, respectively. In one exemplary embodiment, if the instability accumulated by counter stage 222 is beyond a desired number, the weld cycle is rejected as indicated by block 226.

A second analysis implementation of computer program 200 shown in FIG. 7 is illustrated as block 230. This is a program enabled during the weld cycle. The total instability of the weld cycle accumulating during all wave shapes is analyzed as a total number wherein 100 is the most stable arc. The output of this stability accumulator and analyzing stage is read, stored or otherwise retained as indicated by block 236. If the reading stage 234 is below a set stability then the weld cycle is rejected as indicated by block 238. A person skilled in the art can design other programs for analyzing the results of the monitor M from stability stage 91. The computer program 200 exhibits two implementations to analyze the obtained weighted stability data. The two implementations can be selectively enabled (either one or the other or both) depending on the nature of the arc stability or weld quality problem the monitor is configured to detect. It is advantageous to read stability in only selected states of the wave shapes, because stability over a variable pulse is not obtainable.

Figure 8:
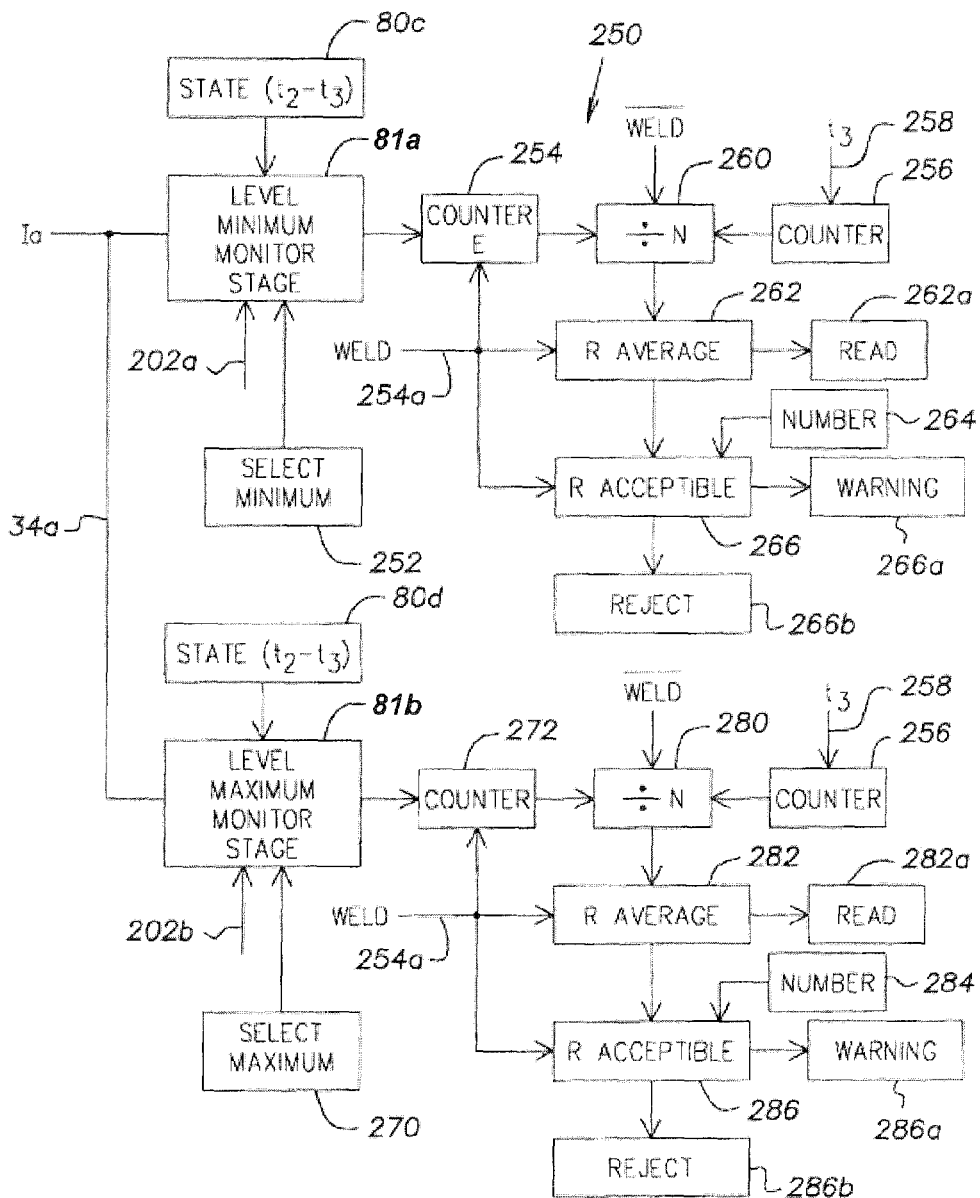
FIG. 8 is a block diagram and computer flow chart or program to process information from the level monitor stages of the exemplary embodiment shown in FIG. 1.

In accordance with another exemplary embodiment, the computer program for analyzing the results of level monitor stage 81 of monitor M (i.e., the weighted read values) is shown in FIG. 8. In this illustrated embodiment, level analysis program 250 processes the output from monitor level stage 81 in two separate routines, identified as a minimum monitor stage 81a with filter 80c and a maximum monitor stage 81b with filter 80d. Either one of these stages can be used separately or, in practice, they are combined. Subsection 81a relates to the determination of transitions 186 shown in FIG. 6 which is an event where the actual parameter is below the threshold minimum 182. The minimum level on line 202a from generator 40 is used when stage 81a is selected by program step 252. These events are counted by block 254 for each of the weld cycles as indicated. The counter is enabled during the weld cycle by the logic on line 254a. Counter 254 is a running total of the wave shapes used in a weld cycle. The number of wave shapes is obtained by counting the occurrences of time $t_3$ from the output of generator 40 as indicated by line 258. As indicated before, the first part of the state is generally ignored to remove normal inconsistencies at the start of any particular state. Block 260 is the computer flow chart subroutine for dividing the accumulated minimum events 186 from monitor stage 81a divided by the number N from the counter 256. This provides an average of minimum transitions during the weld cycle, which is provided to subroutine 262. The average minimum transitions are read, stored or otherwise output as indicated by block 262a. If the average is above a certain threshold number provided by the wave generator or by the program step 264, program routine 266 determines that the weld cycle is unacceptable. If acceptable, no action is taken. However, if the acceptable routine 266 determines that the average is merely approaching the number 264, a warning signal is provided by block 266a. Total unacceptability provides a weld reject signal by routine 266b. A person skilled in the art can devise other computer programs for effecting the analysis of the minimum current deviation or transition of the actual parameter as it relates to a set threshold.

In FIG. 8, the maximum monitor stage 81b operates in conjunction with the minimum stage 81a. The maximum level is on line 202b from generator 40 and is used when stage 81b is selected by program 270. Like data information and programming retains the same numbers. Counter 272 counts the number of events 184 during the state $t_2$-$t_3$. Subroutine 280 provides the average of events 184 during the various wave shapes formed during the weld cycle. This average in block 282 is read, stored or otherwise used as indicated by block 282a. In block 286, the acceptability subroutine is processed wherein the number indicated by block 284 output from generator 40 or otherwise implemented by computer program is compared with the average from block 282 to provide a warning signal as indicated by block 286a when the average approaches the set number indicated by block 284. If the number is reached, a reject subroutine is implemented as indicated by block 286b.

In practice, stage 81a and stage 81b are implemented together and the average of both transitions from blocks 262 and 282 are analyzed by a read, acceptable number to give a warning and/or a rejection of a given weld cycle. Consequently, in practice, minimum level deviations are analyzed, maximum level deviations are analyzed, and total level deviations are analyzed. All of this is accomplished by the computer program as schematically illustrated in FIG. 8. The level stages 81a, 81b output level conditions which are stored and/or displayed as discussed with report logic 82. The level conditions output by the level stages 81a, 81b can be weighted, as discussed herein.

In view of the above, the use of the magnitude and time contribution weights provide a more accurate measure of parameter stability and, thus, overall weld quality. In this manner, an easy to understand numerical value or score can be computed to quantify the overall quality of a weld. In one exemplary embodiment, a weld score between 0-100 or 0%-100% is calculated for a weld based on monitored welding conditions or parameters, such as those monitored by the exemplary embodiment shown in FIG. 1. Such a weighting method (e.g., the weighting method 900 shown in FIG. 9 and described below) could be implemented, for example, in level monitor stage 81, stability monitor stage 91, or any similar or related data processing stage.

Figure 9:
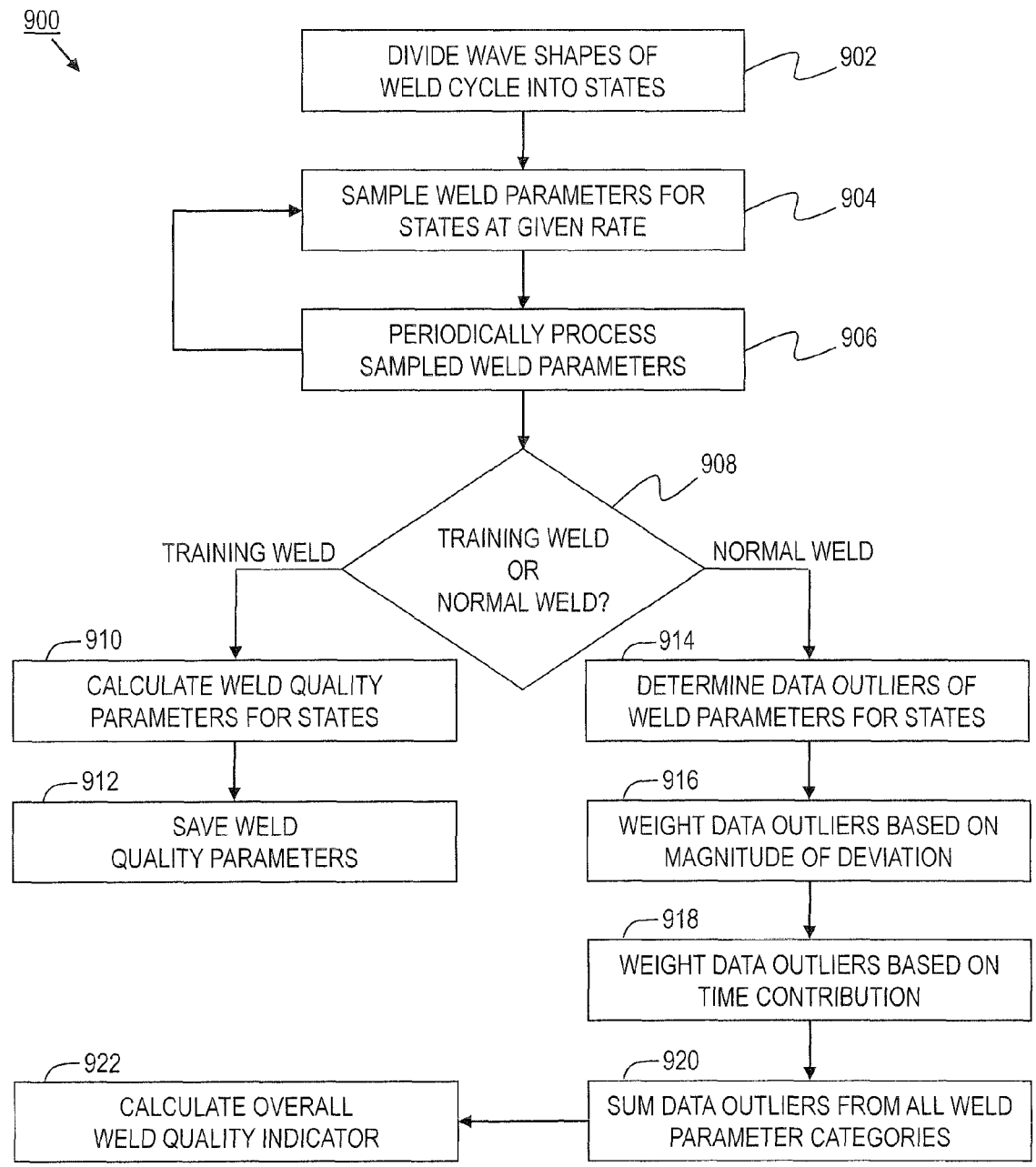
FIG. 9 is a flowchart illustrating a weighting method for weighting sampled weld data parameters, according to one exemplary embodiment.

A weighting method 900, according to one exemplary embodiment, is shown in FIG. 9. The weighting method can be implemented, for example, in the monitor M. In an initial step 902 of the weighting method 900, waves shapes of a weld cycle are divided into a series of time segmented portions or states. Then, in step 904, weld parameters (e.g., voltage, amperage) corresponding to at least one of the states are sampled at a given rate. In one exemplary embodiment, the sampling rate is 120 kHz. In one exemplary embodiment, the sampling rate is greater than or equal to 120 kHz. In one exemplary embodiment, the sampling rate can be used to generate an interrupt for interrupt service routine (ISR) processing.

The sampled weld parameters are used to calculate weld data. In the exemplary weighting method 900, the weld data include an execution count, a voltage sum, a voltage squared sum, an amperage sum, and an amperage squared sum. The execution count starts at zero and gets incremented by one for each sampling period (e.g., every 120 kHz). The voltage sum and the amperage sum start at zero and get increased by the sampled voltage and the sampled amperage, respectively, at each sampling period. Similarly, the voltage squared sum and the amperage squared sum start at zero and get increased by the square of the sampled voltage and the square of the sampled amperage, respectively, at each sampling period.

After a predefined sampling period, in step 906, the sampled weld data is passed on for further processing (as described below), the weld data values are reset to zero, and the sampling process (i.e., step 904) is repeated. In one exemplary embodiment, the sampling period is 250 ms. Each collection of sampled weld data forms an analysis packet. After further processing of the analysis packet (e.g., every 250 ms), additional weld data is available representing a current weld quality rating for the corresponding state. This additional weld data could be graphed and/or averaged. The average of these ratings over the length of the weld (i.e., the weld cycle) provides an overall quality indicator for the weld.

The further processing of the weld data of each analysis packet that occurs in step 906, for each of the sampled states, results in the calculation of additional weld data. The additional weld data include an execution count, a voltage average, a voltage root mean square (RMS), a voltage variance, an amperage average, an amperage RMS, and an amperage variance. The value of the execution count of the additional weld data is copied from the value of the execution count of the weld data. The voltage average is calculated as the voltage sum (from the weld data) divided by the execution count. The voltage RMS is calculated as the square root of the quotient obtained by dividing the voltage squared sum (from the weld data) by the execution count. The voltage variance is calculated as the voltage RMS minus the voltage average. The amperage average is calculated as the amperage sum (from the weld data) divided by the execution count. The amperage RMS is calculated as the square root of the quotient obtained by dividing the amperage squared sum (from the weld data) by the execution count. The amperage variance is calculated as the amperage RMS minus the amperage average.

After step 906, subsequent processing depends on whether the current weld is a training weld to be used in determining weld quality parameters or a normal weld to be evaluated against such weld quality parameters. Thus, in step 908, it is determined whether the current weld is a training weld or a normal weld. In one exemplary embodiment, the default condition is that a weld is a normal weld unless otherwise indicated (e.g., by user input).

If the current weld is determined in step 908 to be a training weld, the following additional weld data values are saved for a significant portion of the training weld (e.g., 20-30 seconds): the execution count, the voltage average, the voltage variance, the amperage average, and the amperage variance, whereas the other weld data values and additional weld data values can be disregarded. The significant portion of the training weld is the training period. In one exemplary embodiment, the training period corresponds to at least 80 consecutive analysis packets (i.e., sampling periods).

Thereafter, in step 910, weld quality parameters are calculated using the additional weld data values saved during the training period. For example, the following weld quality parameters are calculated for each of the sampled states: a quality execution count average, a quality execution count standard deviation, a quality voltage average, a quality voltage standard deviation, a quality amperage average, a quality amperage standard deviation, a quality voltage variance average, a quality voltage variance standard deviation, a quality amperage variance average, and a quality amperage variance standard deviation.

The quality execution count average is calculated as the average of the execution counts from all of the analysis packets processed during the training period. The execution counts could be rounded to integers. The quality execution count standard deviation is calculated as the standard deviation of the execution count from each analysis packet processed during the training period relative to the quality execution count average. The quality voltage average is calculated as the average of the voltage averages from all of the analysis packets processed during the training period. The quality voltage standard deviation is calculated as the standard deviation of the voltage average from each analysis packet processed during the training period relative to the quality voltage average. The quality amperage average is calculated as the average of the amperage averages from all of the analysis packets processed during the training period. The quality amperage standard deviation is calculated as the standard deviation of the amperage average from each analysis packet processed during the training period relative to the quality amperage average. The quality voltage variance average is calculated as the average of the voltage variances from all of the analysis packets processed during the training period. The quality voltage variance standard deviation is calculated as the standard deviation of the voltage variance from each analysis packet processed during the training period relative to the quality voltage variance. The quality amperage variance average is calculated as the average of the amperage variances from all of the analysis packets processed during the training period. The quality amperage variance standard deviation is calculated as the standard deviation of the amperage variance from each analysis packet processed during the training period relative to the quality amperage variance. As noted above, these quality parameters, when based on delivery of a confirmed good or otherwise acceptable weld, can be used as benchmarks to measure or otherwise rate subsequent welds.

If the current weld is determined in step 908 to be an evaluation weld (i.e., a weld requiring evaluation of its quality), as opposed to a training weld, none of the weld data or additional weld data need be saved. Instead, the results of various quality calculations are obtained and saved. These quality calculations include initially detecting, in step 914, the presence of various outliers. An outlier is a data point or value that is more than a threshold distance from a mean value to which the data point or value contributes. In one exemplary embodiment, an outlier is a value that falls outside the limit of three standard deviations from the mean value.

In the weighting method 900, the outliers sought in step 914 include execution outliers, voltage outliers, voltage variance outliers, amperage outliers, and amperage variance outliers. For each of the monitored states, each of the analysis packets are evaluated to detect the presence of any of these outliers.

If an analysis packet satisfies the following relationship, it is considered an execution outlier: absolute value of (execution count-quality execution count average)>(3×quality execution count standard deviation). If an analysis packet satisfies the following relationship, it is considered a voltage outlier: absolute value of (voltage average-quality voltage average)>(3×quality voltage standard deviation). If an analysis packet satisfies the following relationship, it is considered a voltage variance outlier: absolute value of (voltage variance-quality voltage variance average)>(3×quality voltage variance standard deviation). If an analysis packet satisfies the following relationship, it is considered an amperage outlier: absolute value of (amperage average-quality amperage average)>(3×quality amperage standard deviation). If an analysis packet satisfies the following relationship, it is considered an amperage variance outlier: absolute value of (amperage variance-quality amperage variance average)>(3×quality amperage variance standard deviation).

After detection of these outliers, a two-step weighted sum (i.e., from steps 916 and 918) of each outlier is used in calculating a quality indicator for the corresponding analysis packets.

The first step (i.e., step 916) in weighting each of the outliers is determined by the magnitude of the outlier relative to a three standard deviation limit. In general, approximately 0.3% of the data points or values could fall outside the limit of three standard deviations and, thus, be considered an outlier. The weighting of the outlier increases as its value increases above the limit of three standard deviations. The outlier is weighted at a full 100% at four standard deviations and is weighted at a maximum of 200% at five standard deviations. In general, the probability of a fully (i.e., 100%) weighted outlier occurring in a normal data set is 1 in 15,787.

Thus, in step 916, each of the outliers is weighted in accordance with this approach. The weight to be applied to each execution outlier is calculated as the absolute value of (amount above three standard deviation limit/quality execution count standard deviation), with a maximum weight value being 2.0. The weight to be applied to each voltage outlier is calculated as the absolute value of (amount above three standard deviation limit/quality voltage standard deviation), with a maximum weight value being 2.0. The weight to be applied to each voltage variance outlier is calculated as the absolute value of (amount above three standard deviation limit/quality voltage variance standard deviation), with a maximum weight value being 2.0. The weight to be applied to each amperage outlier is calculated as the absolute value of (amount above three standard deviation limit/quality amperage standard deviation), with a maximum weight value being 2.0. The weight to be applied to each amperage variance outlier is calculated as the absolute value of (amount above three standard deviation limit/quality amperage variance standard deviation), with a maximum weight value being 2.0.

The second step (i.e., step 918) in weighting each of the outliers is determined by the execution count of the outlier's state. In particular, the value of each outlier is multiplied by the execution count of the outlier's state, thereby accounting for the time contribution of the state relative to the overall wave shape. In this manner, states that have larger execution counts (i.e., execution times) produce outliers with correspondingly heavier weighting. Consequently, as the execution time for a particular outlier increases, the weight of the outlier will also increase.

The weighting of the outliers, in steps 916 and 918, produce a set of final weighted outliers including final weighted execution outliers, final weighted voltage outliers, final weighted voltage variance outliers, final weighted amperage outliers, and final weighted amperage variance outliers. These final weighted outliers are summed in step 920 to produce a final weighted outlier sum for each analysis packet. Thereafter, determination of a quality indicator for each of the analysis packets is calculated, in step 922, as the quotient obtained by dividing a perfect quality value minus the final weighted outlier sum by the perfect quality value. The perfect quality value is equal to the execution count for the analysis packet multiplied by the number of outlier categories (i.e., in this case five).

Thus, an instantaneous quality indicator (i.e., for the current completed analysis packet) can be determined during the welding process and communicated to the welder or otherwise utilized. In this manner, potential problems can be detected as they occur, i.e., during the welding process, as opposed to only after the weld is complete, when it is likely too late to take any corrective action.

Furthermore, the average of the quality indicators aggregated up to any point of time during the welding process can be averaged to determine a quality indicator of the weld up to that point of time. For example, after the welding process is complete, all of the individual quality indicators can be averaged to obtain an overall quality indicator, score, grade, rating or the like for the completed weld. The overall quality indicator for the weld can be compared against a predetermined quality indicator (e.g., derived from a training weld) that reflects the minimum quality indicator value for an acceptable weld.

In this manner, a quality of a weld can be determine accurately, efficiently, consistently, and/or automatically, in real-time or near real-time. This is particularly advantageous since visible inspection of a weld is not always sufficient to gauge its quality and since an operator might not detect or otherwise appreciate deviations or other problems during the welding process that can affect overall weld quality.

In some exemplary embodiments, a quality indicator (i.e., a weld score) for a weld is an effective tool for evaluating welds being repetitively produced under substantially the same conditions and according to substantially the same arc welding process, such as during an automated (e.g., robotic) welding process. By calculating instantaneous, periodic, and/or overall weld scores for each weld, an automated quality control process can be adapted for the arc welding process. In particular, a minimum acceptable weld score or range of acceptable weld scores is initially identified as a threshold, according to the weld conditions and the arc welding process. Thereafter, each weld has its (instantaneous, periodic, and/or overall) weld score compared against the threshold to quickly and accurately determine whether the weld should be accepted or rejected. Additionally, by evaluating trends across the weld scores for a production run or set of runs, problems in the production process can be more readily identified, and/or the production process can be more readily optimized.

Figure 10:
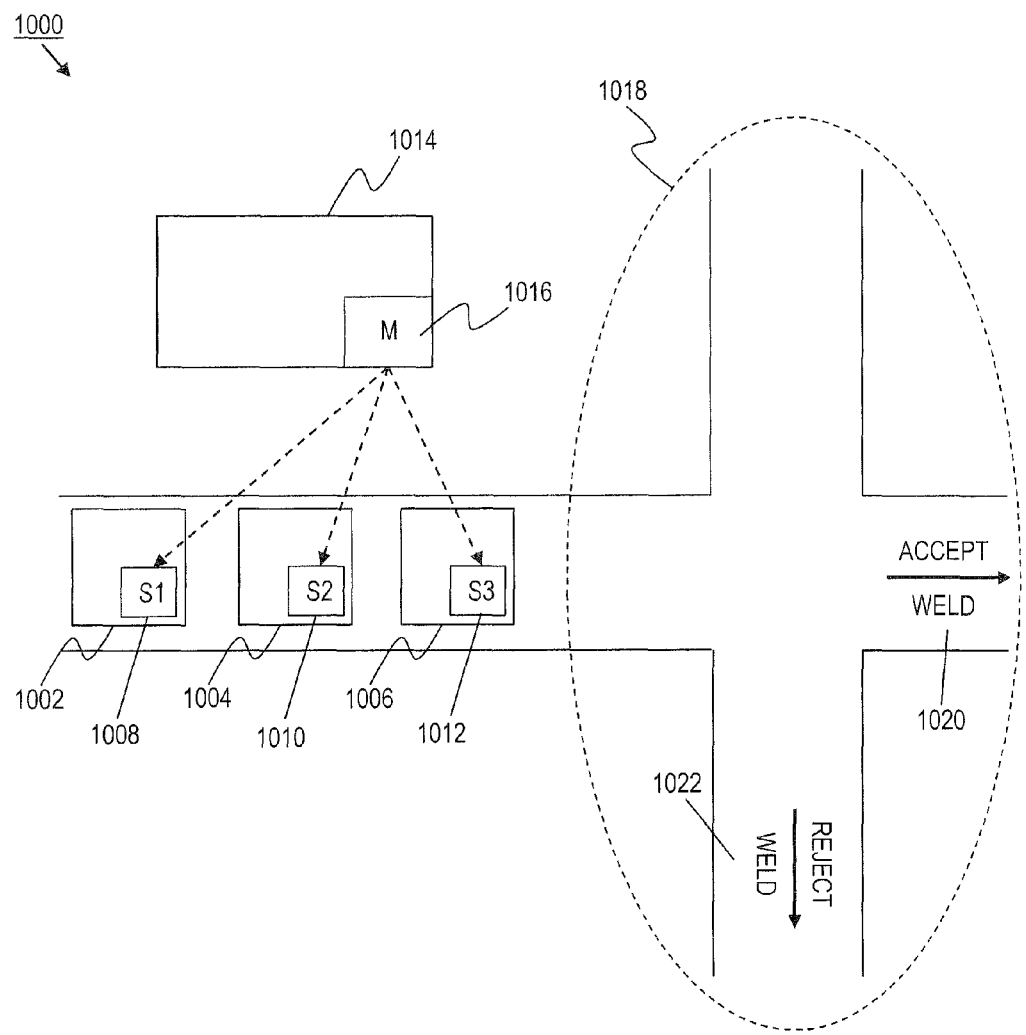
FIG. 10 is a diagram of a conceptual production line, according to one exemplary embodiment.

A conceptual production line 1000 is shown in FIG. 10, wherein a first weld score S1 1002, a second weld score S2 1004, and a third weld score S3 1006 are associated with welds performed on a first workpiece WP1 1008, a second workpiece WP2 1010, and a third workpiece WP3 1012, respectively, by a welder or welding station 1014 including an integrated monitor M 1016. One of ordinary skill in the art will appreciate that the different welds could be performed on the same workpiece.

The weld scores are then compared against a predetermined acceptable weld score threshold to determine whether each of the welds should be accepted or rejected. This comparison can be done by the welder/welding station or by a separate device or at a separate location (e.g., an evaluation station 1018). In one exemplary embodiment, the comparison between the weld score and the threshold is performed manually. In one exemplary embodiment, an automated and manual comparison are performed. In one exemplary embodiment, the weld score is used to determine whether a manual inspection of the corresponding weld is warranted. In one exemplary embodiment, the weld scores are used, at least in part, to determine an overall efficiency of the production line.

In one exemplary embodiment, one or more evaluation stations 1018 are situated along the production line 1000 to measure welds at specified stages of the production process. If an evaluation station 1018 determines that a weld score for a weld meets or exceeds a predetermined acceptable weld score threshold, the evaluation station 1018 accepts the weld by issuing an accept weld command 1020. In response to the accept weld command 1020, the workpiece including the acceptable weld is allowed to continue along the production line 1000 for further processing.

Conversely, if the evaluation station 1018 determines that the weld score for the weld falls below a predetermined acceptable weld score threshold, the evaluation station 1018 rejects the weld by issuing a reject weld command 1022. In response to the reject weld command 1022, the workpiece including the unacceptable weld is routed off of the production line 1000 or otherwise removed from the production line 1000 (e.g., manually removed). Thereafter, the workpiece having the rejected weld can be subjected to further processing, for example, rehabilitating or otherwise repairing the rejected weld, or recycling the workpiece entirely.

In one exemplary embodiment, each accept weld command 1020 and/or reject weld command 1022 is logged or otherwise stored for later review and analysis. In this manner, trends relating to the welding process and/or the production process can be more readily identified, which in turn, may make it easier to increase the overall efficiency of the production line utilizing the welding process.

In some exemplary embodiments, quality indicators (i.e., weld scores) computed for welds can be used in an innovative approach to providing instruction or otherwise teaching an operator manually performing an arc welding process. In particular, as the operator is using a welder (e.g., the electric arc welder 10) to create the weld, instantaneous and/or periodic weld scores are determined for the weld by the welder (e.g., via a monitor M of the welder) and are used to provide direct feedback to the operator relating to the current quality of the weld. As noted above, these weld scores are based on weighted, statistical measurements that more accurately reflect weld quality as compared to a mere visual inspection of the weld. In particular, the weld scores are compared against a predetermined acceptable weld score or range of acceptable weld scores to determine whether any corrective action is necessary by the operator. Additionally, the weld scores are evaluated over time to determine whether any trend in moving away from an acceptable weld score (e.g., as evidenced by a continuing reduction in the weld score) is present.

Figure 11:
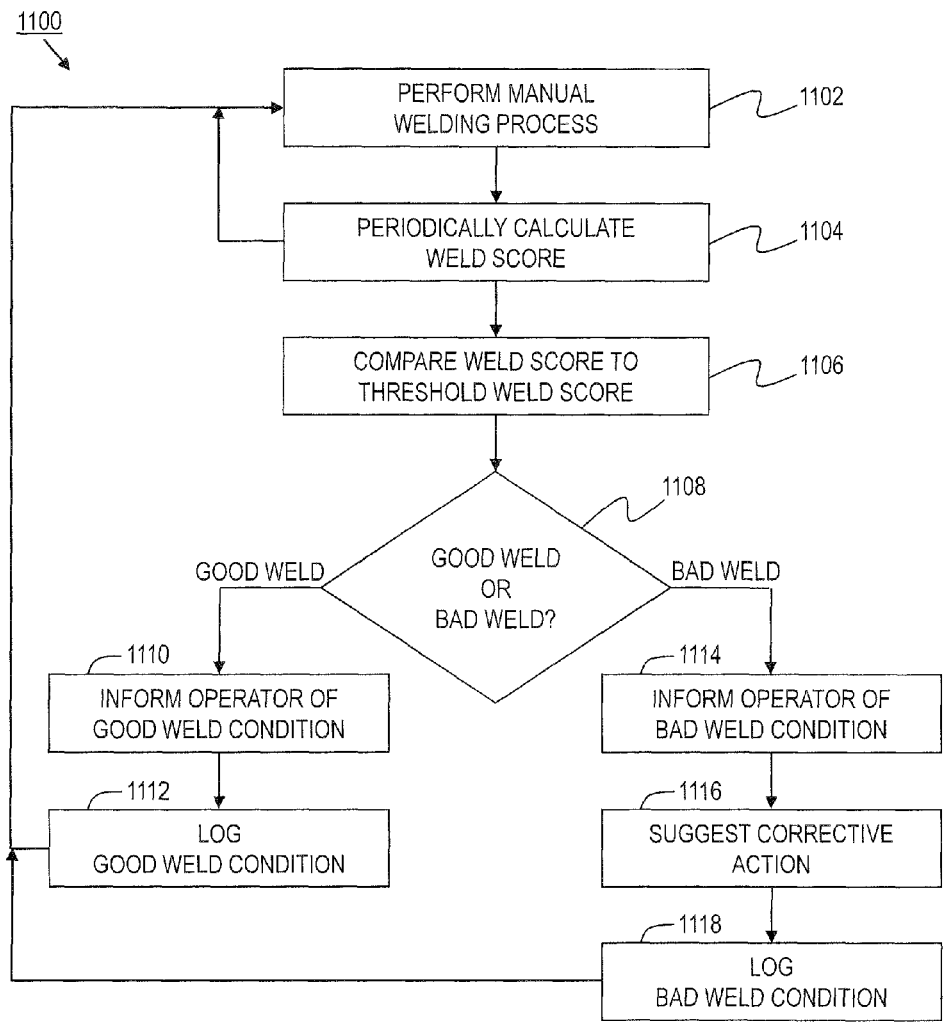
FIG. 11 is a flow chart illustrating a method of instruction, according to one exemplary embodiment.

A method of instruction 1100, according to one exemplary embodiment, is shown in FIG. 11. The method 1100 begins with an operator starting to perform a welding process in step 1102.

During the welding process, a weld score is periodically calculated (based on one or more sampled or otherwise measured parameters), in step 1104, to reflect a current status of the weld. The weld score can be calculated as an instantaneous measurement reflecting the current status of the weld or as an average of several measurements reflecting the status of the weld over a period of time (corresponding to the measurements) during the welding process. In one exemplary embodiment, the weld score is calculated by averaging all of the measurements taken since the welding process started, which reflects a current overall status of the weld.

Next, the weld score is compared to a predetermined threshold weld score in step 1106. The threshold weld score is a minimum weld score for a good or otherwise acceptable weld status. If the weld score is greater than or equal to the threshold weld score, the current status of the weld is determined to be good in step 1108. Otherwise, the current status of the weld is determined to be bad in step 1108.

If the current status of the weld is good, the operator is provided with an indication that the weld is good, in step 1110, which suggests that the welding process is being performed properly. Thereafter, the current status of the weld is logged, in step 1112, for later review, analysis, and/or other use. The method of instruction 1100 then continues to monitor the welding process being performed by the operator, as described above.

If the current status of the weld is bad, the operator is provided with an indication that the weld is bad, in step 1114, which suggests that the welding process is being performed improperly. Thereafter, the current status of the weld is logged, in step 1118, for later review, analysis, and/or other use. The method of instruction 1100 then continues to monitor the welding process being performed by the operator, as described above.

The aforementioned indications can be provided to the operator in any manner sufficient to inform the operator during the welding process. In one exemplary embodiment, the indication is provided to the operator visually, such as on a display device integrated with or in close proximity to the welder. In one exemplary embodiment, the instruction is visually displayed on a protective visor or headgear worn by the operator. In one exemplary embodiment, the instruction is provided to the operator audibly, such as through a speaker integrated with or in close proximity to the welder. In one exemplary embodiment, the instruction is audibly played in protective headgear worn by the operator.

In one exemplary embodiment, if the current status of the weld is bad, the operator receives instruction on what corrective action or actions should be taken in step 1116. In one exemplary embodiment, the instruction is provided in real-time during the welding process. The instruction could, for example, involve a suggested change in a position of an electrode (i.e., wire) relative to the workpiece or a suggested change in a rate of movement of the wire relative to the workpiece.

Various devices and techniques could be used to determine possible corrective actions to be taken, such as modeling operator and/or welding conditions during a welding process that results in a verified good weld and using the resulting model data to evaluate other operators carrying out similar welding processes under similar conditions. Artificial intelligence and related simulations could also be used to build such a model. Furthermore, sensors could be used to build such a model.

In one exemplary embodiment, one or more sensors are used to determine aspects of the welding process, for example, a current temperature of the workpiece, a level of shielding gas being delivered, and/or a composition of the shielding gas. In one exemplary embodiment, one or more sensors are used to determine environmental conditions that could affect the welding process, for example, wind conditions and/or humidity conditions. In one exemplary embodiment, one or more sensors are used to determine operator conditions that could affect the welding process, for example, the distance of the operator's hand from the workpiece and/or the angle of the operator's hand from the workpiece. Data from these or other sensors is compared to model data to identify the instruction on what corrective action or actions should be taken by the operator.

In one exemplary embodiment, the corrective action instruction is provided to the operator visually, such as on a display device integrated with or in close proximity to the welder. In one exemplary embodiment, the instruction is visually displayed on a protective visor or headgear worn by the operator. In one exemplary embodiment, the instruction is provided to the operator audibly, such as through a speaker integrated with or in close proximity to the welder. In one exemplary embodiment, the instruction is audibly played in protective headgear worn by the operator.

Thus, the method of instruction 1100 provides real-time feedback to the operator during the welding process, such that the operator readily knows when the weld is moving from a good condition toward a bad condition and when the weld is moving from a bad condition toward a good condition. Furthermore, the method of instruction 1100 can suggest corrective action intended to improve the current (and thus overall) condition of the weld. As changes in the weld condition are often attributable to the actions of the operator, the feedback provided by the method of instruction 1100 (including any suggested corrective action) teaches the operator good welding techniques. Furthermore, good welding techniques of the operator are reinforced by the continued confirmation of a good weld status.

The method of instruction 1100, or aspects thereof, can also readily be adapted or otherwise applied to a simulated welding process. In one exemplary embodiment, the method of instruction 1100 is applied to a welding simulator utilizing virtual reality technology.

In some exemplary embodiments, a quality indicator (i.e., a weld score) computed for a weld performed by an operator can be used in an innovative approach to certifying the operator with respect to a particular welder, welding process, or welding course, similar to how grades are used in general education. For example, the weld scores (e.g., an overall weld score) calculated in accordance with the method of instruction 1100, or aspects thereof, provide a convenient platform for certifying the operator. The operator must obtain a weld score or scores that exceed predefined threshold weld scores to be certified with respect to the welder, welding process, or welding course. If the operator fails to be certified, the method of instruction 1100 can identify areas that need improvement to the operator. As described herein, additional functionality (e.g., provided by software running in or external to the welder) can be used to measure other parameters that might be useful in certifying the operator. For example, the method of instruction 1100 could be modified to include tracking how much time the operator spent actually welding during the welding process or course.

As another example, the method of instruction 1100 could be modified to include tracking the amount of consumables (e.g., wire) used by the operator during the welding process or course.

In addition to being used to certify an operator, the weld scores (and other parameters) can also be used to differentiate one operator from another. For example, notwithstanding that two operators both achieve passing scores and are certified with respect to a particular welder, welding process, or welding course, the scores of the two operators might be vastly different. Accordingly, a certified operator with a much higher score could be chosen over another certified operation having a lower score.

In some exemplary embodiments, quality indicators (i.e., weld scores) computed for welds and other related parameters and information can be used to assist an instructor teaching multiple students a welding technique, process, program, course, or the like. A welding class often includes a theoretical component and a practical component. The theoretical component is generally taught in the form of a lecture, discussion, or demonstration in a classroom or similar setting. Typically, a welding school or other environment for teaching students the practical component of the class will include individual locations such as booths, similar to welding stations in a factory. Each student is assigned to his or her own booth for performing the practical component of the course.

It is rather easy for the instructor to approximate how much time each student spends on the theoretical component of the class, for example, by tracking each student's class attendance and/or participation during discussions relating to the theoretical component. However, it is difficult for the instructor to gauge how much time each student actually spends on the practical component of the class because the instructor cannot be at all of the booths all of the time. For example, the booths may be constructed and/or arranged such that the instructor's line of sight only extends to a single booth at a time, i.e., the booth at which the instructor is currently present. The students at the other booths could be doing something other than welding (e.g., eating, sleeping, talking on the phone) without the instructor knowing. It is also difficult for the instructor to readily determine which of the students would most likely benefit from the instructor's personal attention, at any given time. Thus, the instructor may wind up devoting time to one student notwithstanding that another student has a greater need for the instructor's personal attention.

Figure 12:
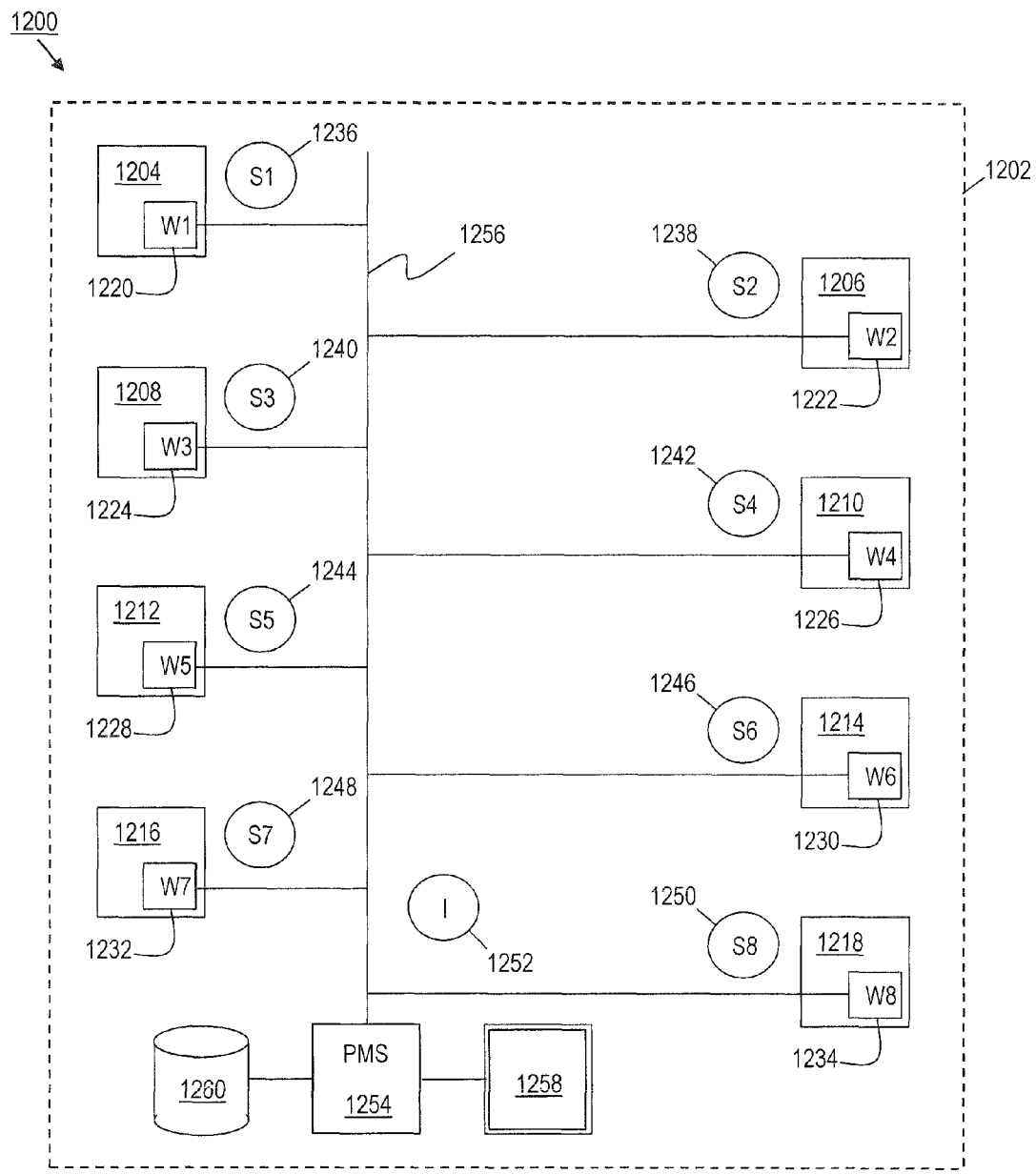
FIG. 12 is a block diagram illustrating a system for monitoring students, according to one exemplary embodiment.

A system 1200 for monitoring students learning a welding technique, process, program, course, or the like, such as an arc welding process, according to one exemplary embodiment, is shown in FIG. 12. The system 1200 includes an area of instruction 1202, such as a classroom or shop, in which eight booths 1204, 1206, 1208, 1210, 1212, 1214, 1216, and 1218 are situated. Each of the booths includes a welder. In particular, a first welder W1 1220 is located in the first booth 1204, a second welder W2 1222 is located in the second booth 1206, a third welder W3 1224 is located in the third booth 1208, a fourth welder W4 1226 is located in the fourth booth 1210, a fifth welder W5 1228 is located in the fifth booth 1212, a sixth welder W6 1230 is located in the sixth booth 1214, a seventh welder W7 1232 is located in the seventh booth 1216, and an eighth welder W8 1234 is located in the eighth booth 1218. Furthermore, a student is assigned to each booth. In particular, a first student S1 1236 is assigned to work in the first booth 1204, a second student S2 1238 is assigned to work in the second booth 1206, a third student S3 1240 is assigned to work in the third booth 1208, a fourth student S4 1242 is assigned to work in the fourth booth 1210, a fifth student S5 1244 is assigned to work in the fifth booth 1212, a sixth student S6 1246 is assigned to work in the sixth booth 1214, a seventh student S7 1248 is assigned to work in the seventh booth 1216, and an eighth student S8 1250 is assigned to work in the eighth booth 1218.

The area of instruction 1202 is situated such that an instructor 1252 can freely move from one booth to another to interact with the students.

In one exemplary embodiment, each of the welders W1, W2, W3, W4, W5, W6, W7, and W8 includes an integrated monitor M, like the welder 10 shown in FIG. 1. When a student is using a welder to create a weld, instantaneous and/or periodic weld scores are determined for the weld by the welder (via the monitor M) and are used to provide direct feedback to the student relating to the current quality of the weld. As described herein, these weld scores are based on weighted, statistical measurements that more accurately reflect weld quality as compared to a mere visual inspection of the weld. In particular, the weld scores are compared against a predetermined acceptable weld score or range of acceptable weld scores (e.g., ascertained from a prior baseline weld) to determine whether any corrective action is necessary by the student. Additionally, the weld scores are evaluated over time to determine whether any trend in moving away from an acceptable weld score (e.g., as evidenced by a continuing reduction in the weld score) is present.

Each of the welders W1, W2, W3, W4, W5, W6, W7, and W8 is in communication with a production monitoring system (PMS) 1254 over a network 1256. The network 1256 can be a wired or a wireless network. In one exemplary embodiment, the network 1256 is an Ethernet network.

The PMS 1254 can be implemented using software, hardware, and combinations thereof, without departing from the spirit and the scope of the general inventive concepts. In one exemplary embodiment, the PMS 1254 is implemented as software running on a general purpose computer (e.g., a PC) with peripherals such as a display device 1258 and a data store 1260 connected thereto. In one exemplary embodiment, the PMS 1254 could include logic integrated with each of the welders, as in the case of the monitors M. As noted above, the PMS 1254 is in data communication with the welders W1, W2, W3, W4, W5, W6, W7, and W8 over the network 1256.

The PMS 1254 is a weld data collection and monitoring tool that is operable, for example, to collect short-term and long-term welding logs complete with statistics for each recorded weld. The PMS 1254 can also track other production related parameters and conditions, such as wire consumption. In the system 1200, the PMS 1254 collects data from each of the welders W1, W2, W3, W4, W5, W6, W7, and W8 to determine an amount of time spent by the respective students S1, S2, S3, S4, S5, S6, S7, and S8 in creating the weld. The amount of time spent by each of the students S1, S2, S3, S4, S5, S6, S7, and S8 (i.e., the welding times) can be saved by the PMS 1254 to the data store 1260 for later retrieval and use. Additionally, the PMS 1254 receives the weld scores from each of the welders W1, W2, W3, W4, W5, W6, W7, and W8 over the network 1256, which can then be saved by the PMS 1254 to the data store 1260 for later retrieval and use. Thus, the PMS 1254 is capable of generating and storing logs of welding times and weld scores for multiple students over multiple evaluation periods, which can be a tremendous resource for the instructor 1252 in teaching and assessing the students.

Additionally, the PMS 1254 can display, in real time, the current welding times for each of the students S1, S2, S3, S4, S5, S6, S7, and S8, in combination with the current weld scores for each of the students S1, S2, S3, S4, S5, S6, S7, and S8, on the display device 1258. In this manner, the instructor 1252, by observing the display device 1258, can get an instant and accurate assessment of the current status of each of the students and their respective welds. This allows the instructor 1252 to better proportion his or her time in relation to those students exhibiting the greatest need.

In the system 1200, the welding times and weld scores can be displayed in any manner, for example, as numerical data and/or as graphical data. In one exemplary embodiment, the PMS 1254 provides a web-based user interface that supports accessing data, viewing data, generating reports, etc. via a web browser.

The system 1200 is readily scalable to accommodate any number of students, as well as multiple instructors.

Figure 13:
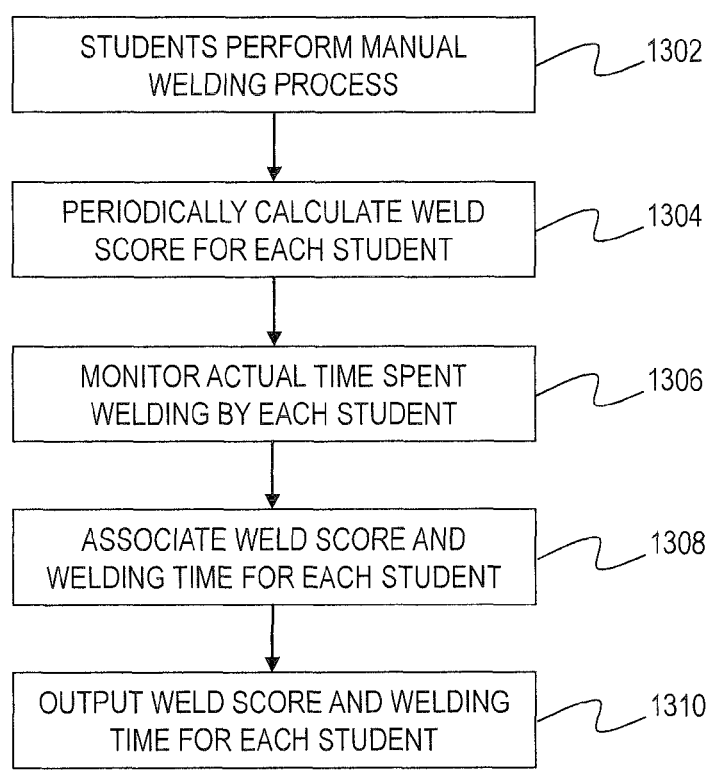
FIG. 13 is a flow chart illustrating a method of monitoring students, according to one exemplary embodiment.

A method 1300 of monitoring students learning a welding technique, process, program, course, or the like, such as an arc welding process, according to one exemplary embodiment, is shown in FIG. 13. The method 1300 involves multiple students performing the arc welding process in step 1302. In one exemplary embodiment, the students perform substantially the same arc welding process under substantially the same conditions and at substantially the same time.

During the arc welding process, a weld score is periodically calculated (based on one or more sampled or otherwise measured parameters) for each student, in step 1304, to reflect a current status of the student's weld. The weld score can be calculated as an instantaneous measurement reflecting the current status of the student's weld or as an average of several measurements reflecting the status of the student's weld over a period of time (corresponding to the measurements) during the arc welding process. In one exemplary embodiment, the students weld score is calculated by averaging all of the measurements taken since the arc welding process started, which reflects a current overall status of the student's weld.

During the evaluation period of the method 1300, an amount of time the each student spends performing the arc welding process (i.e., actually welding) is determined in step 1306. Operational data collected from the welder of each student can be used to determine the students' welding times.

Each weld score is associated with its corresponding student in step 1308. Similarly, each welding time is associated with its corresponding student in step 1308. Identifying information (e.g., a serial number) from the welder assigned to each student can be used to associate data collected from and/or generated by the welders (e.g., the weld score, the welding time) with the respective students.

Once the weld scores and welding times are associated with the respective students, this information can be output in any manner in step 1310. For example, a report of all of the students and their respective weld scores and welding times can be output to a display device, such as a monitor. As another example, information on the students and their respective weld scores and welding times can be logged and stored in a data store, such as a disk drive or flash drive, for later retrieval and use. In one exemplary embodiment, the information is output periodically. In one exemplary embodiment, the information is output at the end of the evaluation period.

The weld scores and/or the welding times can also be used to generate additional identifying information for the students. For example, the weld score and/or the welding time for a student can be compared against predetermined thresholds. In this manner, based on the weld score and/or the welding time for a student, a pass or a fail determination can be determined for the weld of the student.

Figure 14A:
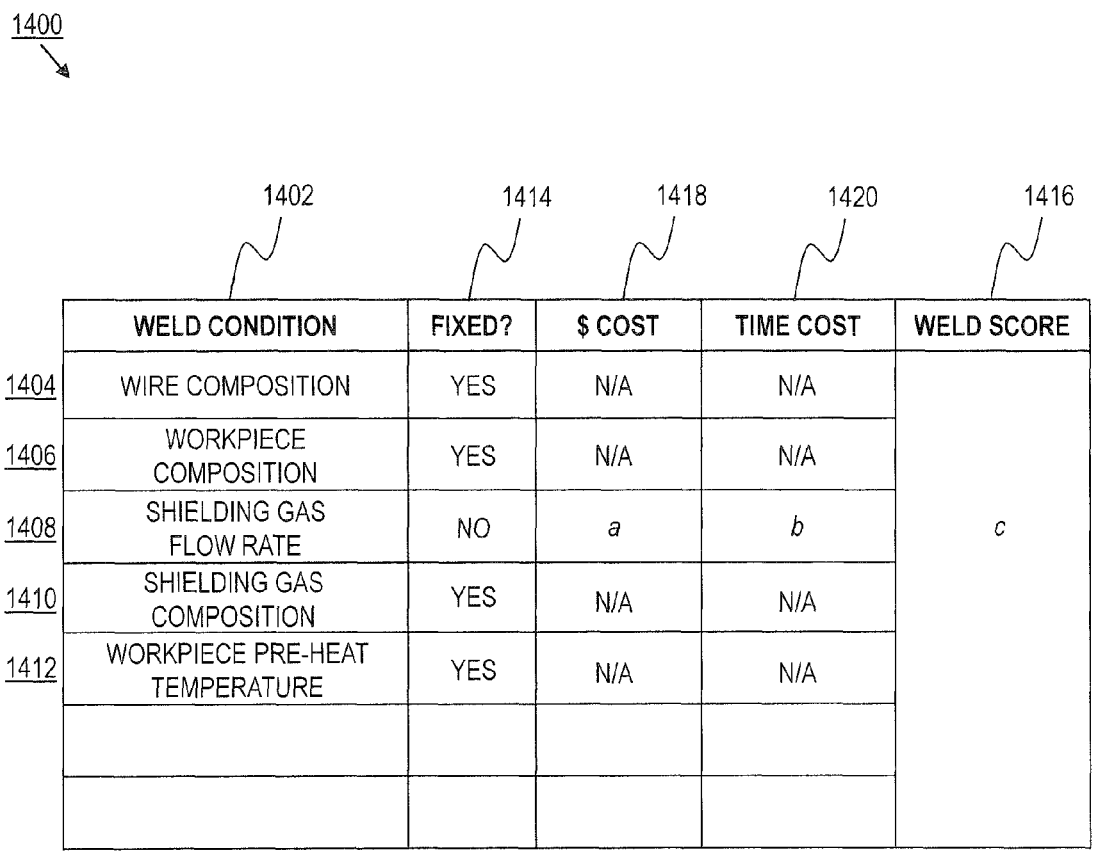

In some exemplary embodiments, weld scores computed for welds can be used in an innovative approach to identifying potential cost savings for a welding process. In one exemplary embodiment, a cost analysis (e.g., cost-effective analysis, cost-benefit analysis) is performed for a welding process based on a series of welds performed according to the welding process. Data 1400 corresponding to exemplary welds, as shown in FIGS. 14A-14B, can be used in performing the cost analysis.

First, a plurality of weld conditions 1402 that affect overall weld quality are selected. For example, in FIGS. 14A and 14B, the weld conditions 1402 include wire characteristics (e.g., wire composition 1404, wire diameter, coating), workpiece characteristics (e.g., workpiece composition 1406, workpiece thickness), a shielding gas flow rate 1408, a shielding gas composition 1410, and/or a workpiece pre-heat temperature 1412. Next, one of these weld conditions 1402 is varied, as indicated at 1414, across the series of welds, while all of the remaining weld conditions 1402 are fixed, as indicated at 1414, across the series of welds.

For each of the welds in the series, a weld score 1416 is also calculated based on the current weld conditions 1402, 1414. The weld score 1416 represents a measure of the overall quality of the weld created under the weld conditions. As noted above, these weld scores are based on weighted, statistical measurements that more accurately reflect weld quality as compared to a mere visual inspection of the weld.

Additionally, for each of the welds in the series, a cost for creating the weld is determined. In one exemplary embodiment, the cost includes monetary expenditures related to producing the weld, represented as a monetary cost 1418 for the weld. In one exemplary embodiment, the cost includes a total time required to complete the weld, represented as a time cost 1420 for the weld. Each weld in the series is associated with its corresponding weld score and cost.

FIGS. 14A and 14B include, respectively, data 1400 for two welds in a series of welds wherein among the weld conditions 1402, the wire composition 1404, the workpiece composition 1406, the shielding gas composition 1410, and the workpiece pre-heat temperature 1412 are fixed, as shown at 1414, across the series of welds, while the shielding gas flow rate 1408 is varied (e.g., incrementally increased or decreased), as shown at 1414, across the series of welds.

For the weld corresponding to FIG. 14A, a monetary cost 1418 of a, a time cost 1420 of b, and a weld score 1416 of c are calculated or otherwise determined. For the weld corresponding to FIG. 14B, a monetary cost 1418 of d, a time cost 1420 of e, and a weld score 1416 of f are calculated or otherwise determined. Thus, if it is determined that a<d, b<e, and c=f, it can be deduced that the shielding gas flow rate 1408 of FIG. 14A is superior to the shielding gas flow rate 1408 of FIG. 14B, since both a cost and time savings are realized without any reduction in overall weld quality by the shielding gas flow rate 1408 of FIG. 14A as compared to the shielding gas flow rate 1408 of FIG. 14B. If it is instead determined that a<d, b>>e, and c=f, it can be deduced that the shielding gas flow rate 1408 of FIG. 14A provides a cost savings without any reduction in overall weld quality, but at a substantially increased time cost, as compared to the shielding gas flow rate 1408 of FIG. 14B.

In this manner, a user will be able to readily identify the impact the varied weld condition has on overall weld quality in the series and, thus, in the corresponding welding process. In this manner, the user can determine whether varying the weld condition (and in what manner) will allow the user to obtain a more desired weld quality, a more desired cost, or both. Consequently, as more welds are performed and the corresponding data analyzed, the impact of any one or more weld conditions on the overall welding process can be readily determined and evaluated, such that more informed cost saving decisions (e.g., relative to money, time, and quality tradeoffs) can be made.

The cost analysis could be expanded to include additional series of welds, wherein different weld conditions are varied in the different series. In this manner, the user can identify a desired value or setting for a plurality of the weld conditions to achieve a desired outcome (e.g., acceptable weld quality and acceptable cost). These desired values or settings for the weld conditions could then be saved in a profile associated with the welder and the welding process for subsequent retrieval and use for the same welder and welding process, thereby increasing the likelihood that the user will again achieve the desired outcome.

In one exemplary embodiment, a plurality of such profiles (i.e., sets of selected weld parameters and/or weld conditions) are saved, i.e., as pre-sets, such that the profiles can be accessed by a user beginning a welding process. In one exemplary embodiment, a plurality of pre-sets are presented to a user along with a weld score corresponding to each pre-set. Each weld score quantifies an overall quality of a weld previously obtained using the weld parameters and weld conditions associated with the pre-set. As noted above, these weld scores are based on weighted, statistical measurements that more accurately reflect weld quality as compared to a mere visual inspection of the weld. The user can then select one of the pre-sets for performing the welding process, thereby increasing the likelihood that the user will achieve the same or a substantially similar weld as that previously produced using the weld parameters and weld conditions associated with the pre-set. In one exemplary embodiment, a user interface is provided to allow the user to filter out pre-sets that do not match criteria input by the user, for example, filtering out those pre-sets that have an associated weld score below an input threshold.

Figure 15:
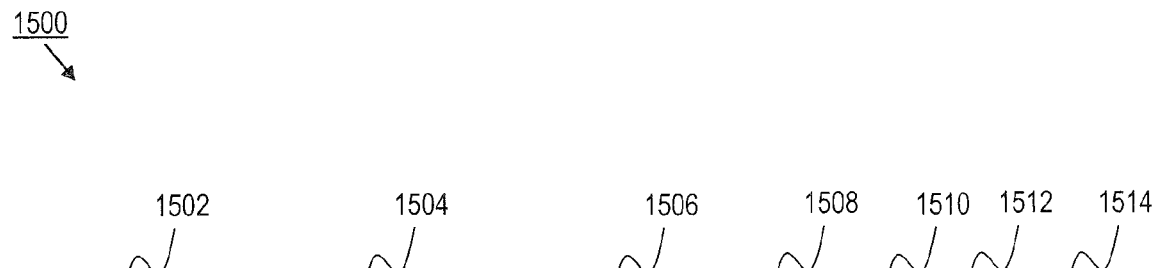
FIG. 15 is a table showing pre-set data associating welding conditions, welders, and welding processes, according to one exemplary embodiment.

FIG. 15 shows pre-sets 1500, according to one exemplary embodiment. Each of the pre-sets 1500 includes an identifying pre-set number 1502, a set of weld conditions 1504, welder information 1506, welding process information 1508, a monetary cost 1510, a time cost 1512, and an associated weld score 1514. A first pre-set 1516, having pre-set number 01, is associated with weld conditions 1504 having values a, b, c, d, and e and a welder M. The first pre-set 1516 corresponds to a welding process O. If a user selects the first pre-set 1516 (i.e., pre-set 01) for performing the welding process O with the welder M under the welding conditions a, b, c, d, and e, the user can expect a weld resulting from the welding process O to have a monetary cost of approximately t, a time cost of approximately v, and a weld score of approximately x. The pre-sets 1500 can include additional pre-sets, such as a second pre-set 1518, associated with different combinations of weld conditions 1504, welders 1506, and/or welding processes 1508.

In addition to the monitored weld parameters already described herein, additional weld parameters may be monitored for one or more states of a wave shape, and additional quality parameters may be calculated therefrom to more accurately detect and identify weld defects. Additional weld parameters may include a welding torch or gun position, a level of sound produced by the arc welding process, at least one frequency of sound produced by the arc welding process, and a pulsing rate of sound produced by the arc welding process. More additional welding parameters include a level of visible light produced by the arc welding process, at least one frequency of visible light produced by the arc welding process, and a pulsing rate of visible light produced by the arc welding process. Further additional welding parameters include a level of infrared light produced by the arc welding process, at least one frequency of infrared light produced by the arc welding process, a pulsing rate of infrared light produced by the arc welding process, and a wire feed motor current level.

In accordance with an embodiment, the additional weld parameters are sensed by sensors or monitoring devices that are appropriate for detecting such weld parameters. For example, sound may be sensed by a microphone, visible light may be sensed by a photo-detector, infrared light may be sensed by an infrared detector, wire feed motor current may be sensed by a current shunt. Torch position may be sensed using one or more types of sensing technologies including, for example, imaging sensors or magnetic sensors. The sensors may be located in various places including, for example, on a welding torch, on a welding helmet, or in the general welding area. The additionally sensed weld parameters may be input to and processed by the monitor M, in a manner similar to how the other weld parameters are input and processed as described previously herein. Other weld parameters that may be monitored an processed include a temperature of the workpiece, a level of a shielding gas, a composition of a shielding gas, a wind speed near the workpiece, a humidity level near the workpiece, and an operator position.

The monitor M may be configured (e.g., as upgraded monitor M' shown in FIG. 16) to calculate a plurality of quality parameter statistics based on the additionally monitored weld parameters. The various quality parameter statistics of "average", "standard deviation", "variance average", and "variance standard deviation" may be calculated for the various additional weld parameters for one or more states of a wave shape in a manner similar to how those quality parameter statistics are calculated for voltage and current as described previously herein. That is, quality parameters based on the additional monitored weld parameters may be calculated in a manner similar to how QVA, AVSD, QVVA, and QVVSD are calculated for monitored voltage, and how QIA, QISD, QIVA, and QIVSD are calculated for monitored current.

For example, the monitor M may be configured to calculate sound level quality parameters during the welding process for one or more states over a period of time such as a quality sound level average (QSLA), a quality sound level standard deviation (QSLSD), a quality sound level variance average (QSLVA), and a quality sound level variance standard deviation (QSLVSD). The monitor M may also be configured to calculate sound frequency quality parameters for one or more states over a period of time such as a quality sound frequency average (QSFA), a quality sound frequency standard deviation (QSFSD), a quality sound frequency variance average (QSFVA), and a quality sound frequency variance standard deviation (QSFVSD). Furthermore, the monitor M may also be configured to calculate sound pulse rate quality parameters for one or more states over a period of time such as a quality sound pulse rate average (QSPRA), a quality sound pulse rate standard deviation (QSPRSD), a quality sound pulse rate variance average (QSPRVA), and a quality sound pulse rate variance standard deviation (QSPRVSD). The sound of the welding process is produced by the arc between the wire electrode and the workpiece. Specific sound characteristics tend to occur during specific states of the welding wave shape.

The monitor M may be configured to calculate visible light level quality parameters during the welding process for one or more states over a period of time such as a quality visible light level average (QVLLA), a quality visible light level standard deviation (QVLLSD), a quality visible light level variance average (QVLLVA), and a quality visible light level variance standard deviation (QVLLVSD). The monitor M may also be configured to calculate visible light frequency quality parameters for one or more states over a period of time such as a quality visible light frequency average (QVLFA), a quality visible light frequency standard deviation (QVLFSD), a quality visible light frequency variance average (QVLFVA), and a quality visible light frequency variance standard deviation (QVLFVSD). Furthermore, the monitor M may also be configured to calculate visible light pulse rate quality parameters for one or more states over a period of time such as a quality visible light pulse rate average (QVLPRA), a quality visible light pulse rate standard deviation (QVLPRSD), a quality visible light pulse rate variance average (QVLPRVA), and a quality visible light pulse rate variance standard deviation (QVLPRVSD). The visible light of the welding process is produced by the arc between the wire electrode and the workpiece.

The monitor M may be configured to calculate infrared light level quality parameters during the welding process for one or more states over a period of time such as a quality infrared light level average (QIRLLA), a quality infrared light level standard deviation (QIRLLSD), a quality infrared light level variance average (QIRLLVA), and a quality infrared light level variance standard deviation (QIRLLVSD). The monitor M may also be configured to calculate infrared light frequency quality parameters for one or more states over a period of time such as a quality infrared light frequency average (QIRLFA), a quality infrared light frequency standard deviation (QIRLFSD), a quality infrared light frequency variance average (QIRLFVA), and a quality infrared light frequency variance standard deviation (QIRLFVSD). Furthermore, the monitor M may also be configured to calculate infrared light pulse rate quality parameters for one or more states over a period of time such as a quality infrared light pulse rate average (QIRLPRA), a quality infrared light pulse rate standard deviation (QIRLPRSD), a quality infrared light pulse rate variance average (QIRLPRVA), and a quality infrared light pulse rate variance standard deviation (QIRLPRVSD). The infrared light of the welding process is produced by the arc between the wire electrode and the workpiece.

The monitor M may be configured to calculate wire feed motor current quality parameters during the welding process for one or more states over a period of time such as a quality wire feed motor current average (QWFMIA), a quality wire feed motor current standard deviation (QWFMISD), a quality wire feed motor current variance average (QWFMIVA), and a quality wire feed motor current variance standard deviation (QWFMIVSD). The wire feed motor current is produced by the motor of the wire feeder during the welding process. When a contact tip becomes worn, or a wrong contact tip is being used, shifts or spikes in the motor current may be observed during certain states.

Again the various quality parameter statistics of "average", "standard deviation", "variance average", and "variance standard deviation" may be calculated for the various additional weld parameters in a manner similar to how those quality parameter statistics are calculated for voltage and current as described previously herein. Furthermore, in accordance with an embodiment, a value of each of the calculated quality parameters for each period of time may be compared to a corresponding expected quality parameter value to determine if a difference between the calculated quality parameter value and the expected quality parameter value exceeds a predetermined threshold. If the difference exceeds the threshold, the calculated quality parameter value may be weighted with a magnitude weight based on the difference, and/or weighted with a time contribution weight based on a time contribution of its state to the wave shape including the state.

Figure 16:
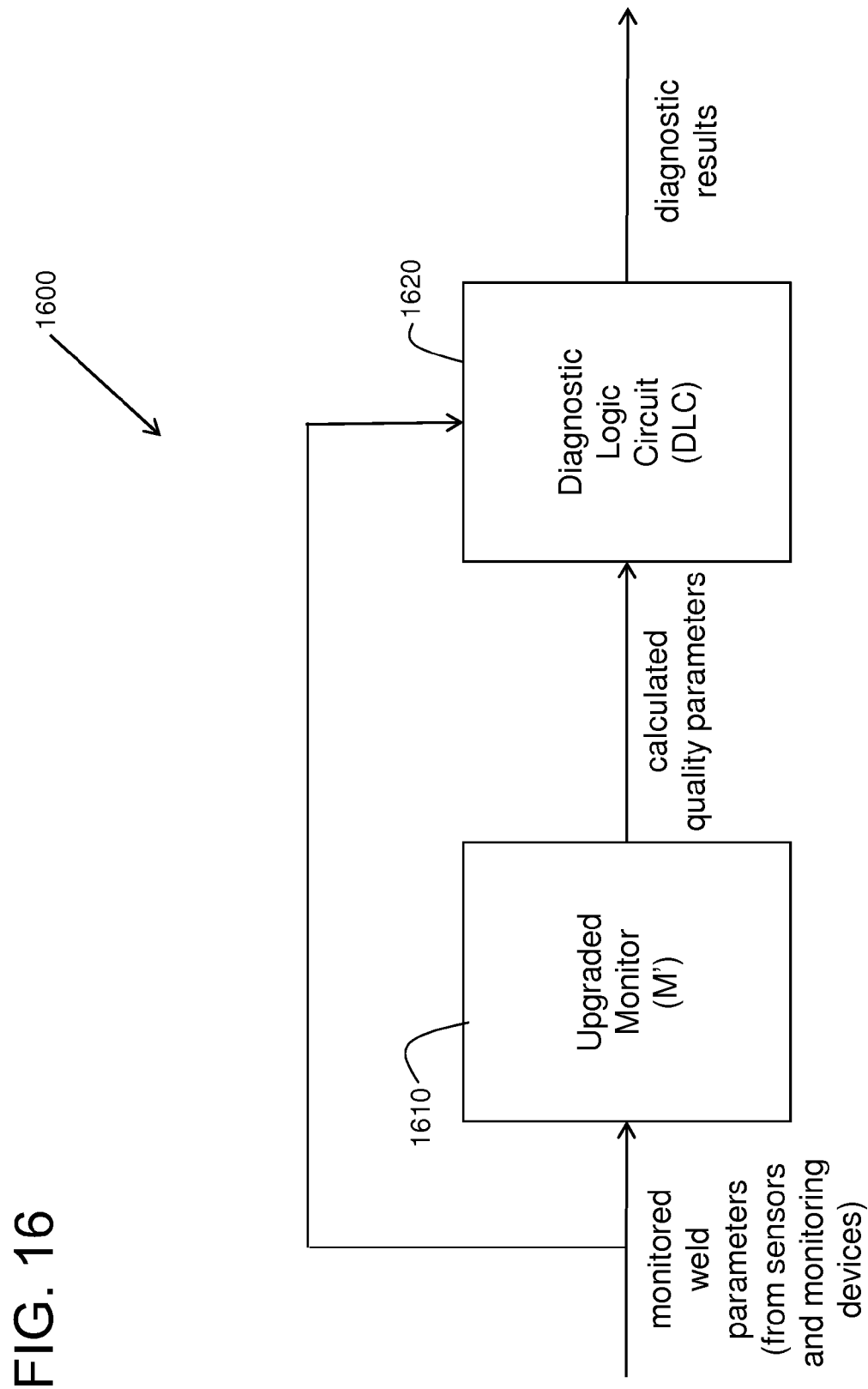
FIG. 16 illustrates a schematic block diagram of an embodiment of a system for diagnosing an arc welding process.

In accordance with an embodiment of the present invention, the quality parameters (weighted or unweighted) and/or the weld parameters may be used to diagnose the arc welding process. FIG. 16 illustrates a schematic block diagram of an embodiment of a system 1600 for diagnosing an arc welding process. The system 1600 corresponds to a portion of an arc welding system and includes an upgraded monitor M' 1610 which is similar to the monitor M but is configured to further monitor the additional weld parameters discussed herein and further calculate the corresponding additional quality parameters. The system 1600 also includes a diagnostic logic circuit (DLC) 1620 in operative communication with the upgraded monitor M' 1610.

As illustrated in FIG. 16, the calculated quality parameters and/or the monitored weld parameters, or some subset thereof, is passed to the DLC 1620 which operates on the parameters to generate diagnostic results. In accordance with an embodiment, the DLC 1620 first identifies localized or continuous defects of the weld by analyzing the quality parameters. A localized defect is a defect that occurs over a relatively short period of time during the welding process (e.g., 2 seconds). A continuous defect is a defect that occurs over essentially the entire time of the welding process (e.g., 20 seconds). Some examples of defects include gas inclusions in the weld (e.g., porosity, blow holes, worm holes), burnthrough of the workpiece, lack of penetration into the workpiece, splatter, an underfilled joint, undercut, cracking of the weld, voids in the weld, and lack of fusion. Such types of defects are well known in the art. Other types of defects may be possible as well.

Some examples of possible causes of defects include a lack of shielding gas, a short contact tip to work distance, a long contact tip to work distance, a clogged nozzle, workpiece surface contamination, too slow a travel speed, too fast a travel speed, too slow a wire feed speed, too fast a wire feed speed, sulfur content in the workpiece or electrode, excessive moisture from the electrode or workpiece, and too small of an electrode angle. Other types of causes of defects are possible as well.

During training weld procedures, defects are correlated to causes of the defects and the DLC 1620 is programmed accordingly to properly associate defects with one or more possible causes. Therefore, during a normal (non-training) welding procedure, the DLC 1620 is able to suggest one or more possible causes of one or more detected defects. The defects and the one or more causes may be reported to the operator, allowing the operator to correct the problem. The DLC 1620 may be programmed as a decision tree, for example, to isolate to a cause of a defect.

As an example, the system 1600 may detect porosity, occurring in certain states, and splatter, occurring in certain other states, as two continuous defects occurring during a welding process by analyzing the quality parameters. The DLC 1620 may correlate the occurrence of the two continuous defects in the respective states to a lack of shielding gas throughout the welding process. The operator may subsequently find that the valve of the gas tank was turned off during the welding process.

Figure 17:
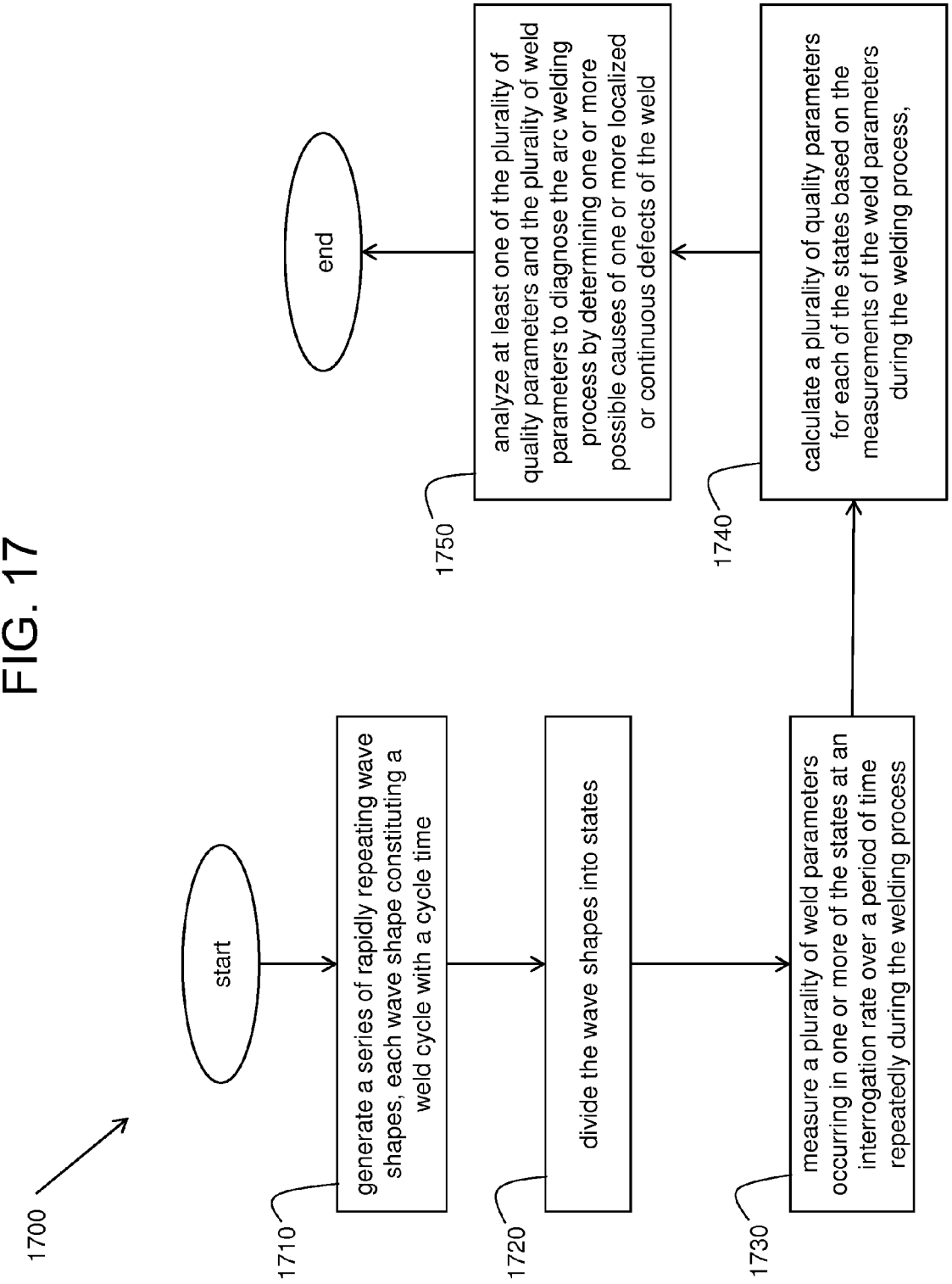
FIG. 17 is a flowchart of a method of diagnosing an arc welding process using the system of FIG. 16 by monitoring an electric arc welder as the welder performs the arc welding process by creating actual welding parameters between an advancing wire and a workpiece to create a weld.

FIG. 17 is a flowchart of a method 1700 of diagnosing an arc welding process using the system 1600 of FIG. 16 by monitoring an electric arc welder as the welder performs the arc welding process by creating actual welding parameters between an advancing wire and a workpiece to create a weld. The welding process is controlled by command signals to a power supply of the welder. In step 1710 of the method 1700, a series of rapidly repeating wave shapes is generated, each wave shape constituting a weld cycle with a cycle time. In step 1720, the wave shapes are divided into states. In step 1730, a plurality of weld parameters occurring in one or more of the states are measured at an interrogation rate over a period of time repeatedly during the welding process.

In step 1740 of the method 1700, a plurality of quality parameters are calculated for each of the states based on the measurements of the weld parameters during the welding process. In step 1750, at least one of the plurality of quality parameters and the plurality of weld parameters are analyzed to diagnose the arc welding process by determining one or more possible causes of one or more localized or continuous defects of the weld.

In summary, an arc welding system and methods are disclosed. The system is capable of monitoring variables during a welding process, according to wave shape states, and weighting the variables accordingly, detecting defects of a weld, diagnosing possible causes of the defects, quantifying overall quality of a weld, obtaining and using data indicative of a good weld, improving production and quality control for an automated welding process, teaching proper welding techniques, identifying cost savings for a welding process, and deriving optimal welding settings to be used as pre-sets for different welding processes or applications.

In the foregoing embodiments, weld parameters are measured or monitored during a welding process to quantify a weld quality. The weld parameters are input to the monitor M (or upgraded monitor M'), which outputs one or more quality parameters, one or more quality indicators (e.g., weld scores), or an accept/reject indicator as described above. It is to be appreciated that the monitor M (or more specifically the circuit, logic, software, etc implementing the monitor) can perform the single task of outputting the one or more quality parameters while other, related, and connected circuits or software can generate quality indicators or accept/reject indicators. These separate functional elements, which can be implemented as circuits, logical elements, software executing on a computer processor, etc., are combinable into larger functional blocks and/or systems. Accordingly, the descriptions of such functional aspects are organized herein for convenience and it is to be appreciated that any combination of such aspects in physical systems are intended to be within the scope of the claimed subject matter.

The quality parameters generated from monitoring a baseline or training welding process can be utilized to evaluate other welding processes. These quality parameters can form the basis of baseline quality indicators, thresholds, or other metrics used to evaluate other welds, as described above. Whether for a training weld or an evaluation weld (i.e., a weld to be measured against the training weld), a welder performs a welding process by creating welding parameters between an advancing wire and a workpiece. The welding process is controlled with command signals to a power supply of the welder, a motor driving the wire feed, etc. For example, the command signals can be transmitted by wave shape generator 40 from FIG. 1 or a controller of the welder, such as controller 1810 described below. The welding parameters are generated according to a waveform, which can include a series of repeating wave shapes, each of which constitutes a weld cycle with a cycle time. Each wave shape can be segmented into states, which as described above, can be monitored independently or collectively to determine quality parameters for individual states, complete weld cycles, or the entire welding process (i.e., the series of repeating wave shapes). The quality parameters of a monitored welding process can be compared to reference or trained quality parameters to evaluate an overall quality of a weld as acceptable or unacceptable. For instance, in one aspect, the trained quality parameters can indicate minimum thresholds to qualify as an acceptable weld. It is to be appreciated that such monitoring and evaluation can occur at the various levels described above. That is, monitoring and evaluation can be performed on a granular level (i.e., over a sampling period), over one state of one wave shape, over the entire wave shape, or over the entire series of wave shapes (e.g., welding process).

In forgoing embodiments, such comparisons are utilized with welding processes generally performed under substantially similar welding conditions as the training weld. Welding conditions such as, but not limited to, contact tip-to-work distance, weld gap, and weld speed (i.e. transit speed) can vary between from welding process to welding process and, further, can vary between successive runs of the same welding process. In addition, the varying welding conditions can affect generated welding parameters. For instance, an arc welder generates a waveform, in the form of command signals for example, to control a power supply of the welder. The waveform is generally configured to regulate a constant output voltage between the wire and the workpiece. However, in response to varying welding conditions, a controller of the welder can alter the waveform to adjust. According to one example, the controller adjusts the waveform (i.e., the command signals) to maintain a constant output voltage.

Varying and differing welding conditions, and subsequent changes implemented by the controller, affect welding parameters generated between the wire and workpiece. Accordingly, when monitoring the welding parameters and determining corresponding quality parameters, noise is introduced both in the welding parameters and in subsequently determined quality parameters and indicators. Such noise impacts reliability of quality indicators and comparisons with training welds performed under different welding conditions.

According to an aspect, non-adaptive portions or states of the waveform can be leveraged to improve monitor performance. That is, welding parameters can be effectively monitored and weld quality can be determined even for welding processes performed in welding conditions differing from the trained conditions or performed under varying welding conditions. Non-adaptive portions of the waveform refer to portions, states, or segments of the waveform for which the command signals do not change with differences in welding conditions. That is, despite different or varying welding conditions, the controller of the welder does not alter the command signal issued to the power supply of the welder the in non-adaptive segments. According to a further example, the non-adaptive segment can refer to portions of the welding process in which adaptive control is not performed. Here, adaptive control refers to the characteristic of the controller to change the waveform to regulate the constant output voltage in response to varying conditions.

In accordance with an embodiment, non-adaptive segments or states of the wave shape are selected for monitoring. Accordingly, variations in welding parameters due to controller adaptations are not encountered. According to another embodiment, non-adaptive segments are evaluated to determine differences in welding conditions between normal (non-training) welding processes and training welding processes. The resultant effects on monitored welding parameters and/or quality parameters can be identified and utilized to remove noise in the model of the welding process. Accordingly, the normal welding processes can be evaluated against the training welding processes despite different welding conditions.

Figure 18:
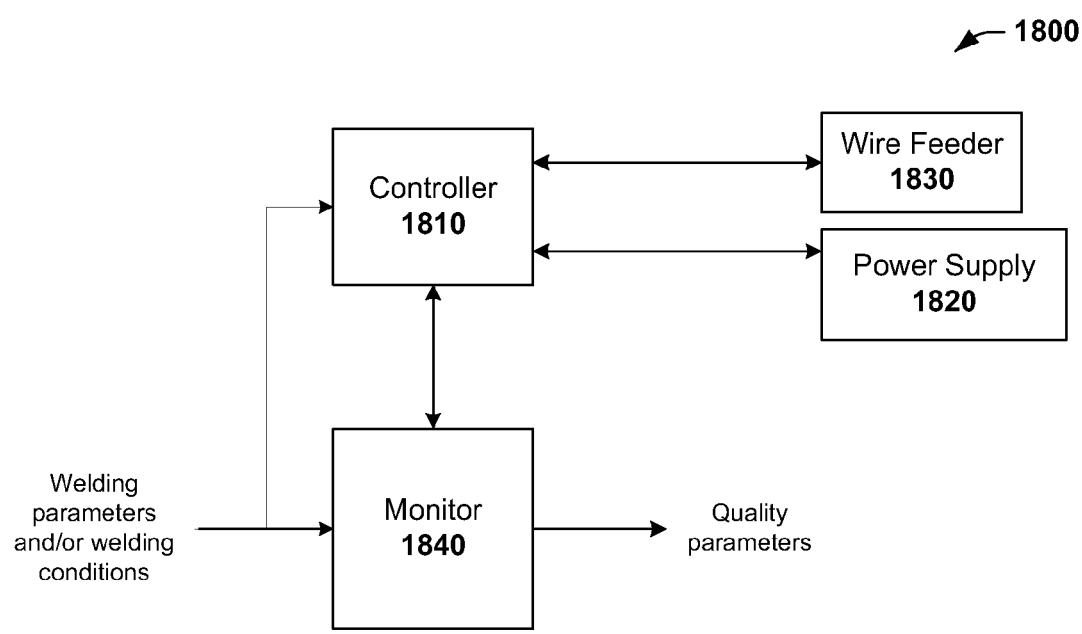
FIG. 18 illustrates a schematic block diagram of an embodiment of a system for adjusting welding process monitoring and evaluation in response to different or varying welding conditions.

FIG. 18 illustrates a schematic block diagram of a system 1800 for adjusting welding process monitoring and evaluation in response to different or varying welding conditions. The system 1800 corresponds to a portion of an arc welding system that includes a controller 1810 and a power supply 1820, and a wire feeder 1830. The system 1800 further includes an monitor 1840 that determines quality parameters based on welding parameters.

Controller 1810 implements a welding process by controller the power supply 1820 and the wire feeder 1830. Controller 1810 generates a waveform and issues command signals, in accordance with the waveform, to the power supply 1820 and the wire feeder 1830. The power supply 1820 and the wire feeder 1830 convert the command signals into suitable outputs to enact the welding process. Moreover, controller 1810 can be configured to provide adaptive control of the welding process. That is, the controller 1810 adjusts the waveform, and accordingly the command signals, in response to welding conditions. Some welding conditions can be measured or sensed directly, with sensors for example, as discussed above. Other differences or changes in welding conditions are indirectly identified by, for example, detecting changes in measured welding parameters (e.g., output voltage, etc.). As shown in FIG. 18, the welding parameters and/or welding conditions monitored, sensed, or measured as described in previous embodiment are input to the controller 1810 to enable adaptive control.

Figure 19:
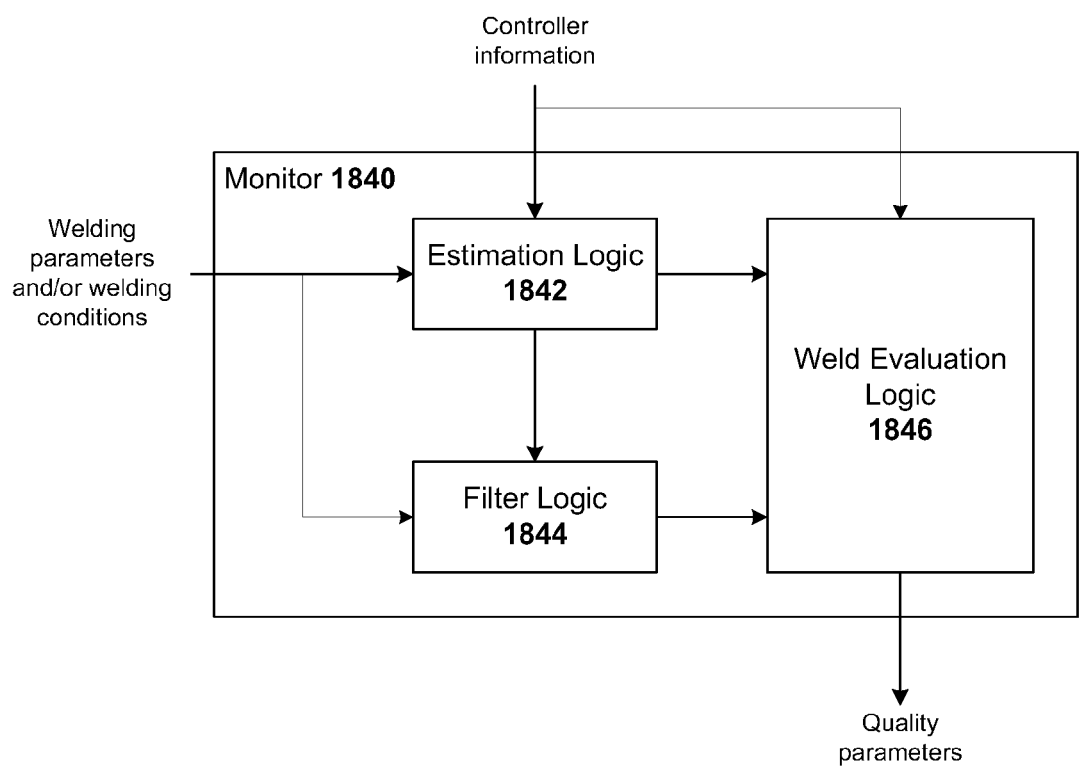
FIG. 19 illustrates a schematic block diagram of an exemplary, non-limiting embodiment of a monitor from the system of FIG. 18 according to one or more aspects.

To facilitate determination of quality parameters, monitor 1840 communicates with controller 1810 to ascertain a current portion or state of the generated waveform, to acquire command signals output by controller 1810, and, in the case of adaptive control, to identify when adaptive control is being applied and to what extent. For instance, to facilitate operation of the monitor 1840, the controller 1810 can temporarily disable adaptive control to remove the effects of such control in the welding parameters measured by the monitor 1840. Turning to FIG. 19, a schematic block diagram of an exemplary, non-limiting embodiment for monitor 1840 is illustrated. As depicted, monitor 1840 includes estimation logic 1842 configured to identify an effect of different or varying welding conditions, under which a welding process is performed, on monitored welding parameters or sensed welding conditions. In an example, estimation logic 1842 outputs noise parameters or a noise signal representing the effect of changing conditions on welding parameters. For instance, estimation logic 1842 can obtain, as input, controller information from controller 1810. The controller information can include, but is not limited to, command signals, waveform states or segments, signals indicative of adaptive changes implemented by the controller 1810, a signal indicative that the controller 1810 is outputting a non-adaptive portion of the waveform, and/or a signal enabling/disabling adaptive control. Non-adaptive portions of the waveform can include peak current segments or background current frequency segments. However, it is to be appreciated that other states or portions can be made or designated as non-adaptive segments.

During a non-adaptive segment of the waveform, estimation logic 1842 can identify deviations, changes, or fluctuations in welding parameters monitored as described previously. In one example, the estimation logic 1842 can utilize techniques similar to those employed by level monitor stage 81 and/or stability monitor stage 91 (described above) to identify differences between a measured welding parameter and a command signal. Alternatively, the estimation logic 1842 can compare welding parameters monitored over the non-adaptive segment against welding parameters recorded for a corresponding segment of a training welding process. Further, in both examples, the estimation logic 1842 can utilize welding conditions sensed, as described in previous embodiments, to determine whether the normal welding process is being performed under different welding conditions from the training welding process. Based on this determination, the estimation logic 1842 can generate a model of the effect of the differing welding conditions on the monitored welding parameters. This model, in turn, be utilized by the estimation logic 1842 to output the noise parameters or noise signal. According to another example, the estimation logic 1842 can output the noise parameters or noise signal based on the identified deviations between the measured welding parameters and the command signals. In other words, once determined that the welding process is performed under different conditions than the training weld, the estimation logic 1842 can attribute such deviations in the welding parameters to those changed conditions and, thus, generate the noise parameters representing the magnitude of the deviations and/or the noise signal as a difference signal between the measured parameters and the command signals.

It is to be appreciated that the estimation logic 1842 can construct or model noise parameters or signals individually for each welding parameter that is monitored. Accordingly, each welding parameter can be adjusted separately in order to monitor and evaluate welding processes despite changing welding conditions. In one aspect, as shown in FIG. 19, monitor 1840 can include filter logic 1844 configured to adjust welding parameters monitored in accordance with the noise parameters or signals provided by the estimation logic 1842. The welding parameters adjusted by filter logic 1844 can be associated with any monitored portion or segment of the waveform, whether adaptive or non-adaptive. Further to this aspect, the filter logic 1844 outputs adjusted or scrubbed welding parameters that account for changed welding conditions which can be substantially overcome with utilization of adaptive control. Accordingly, the adjusted welding parameters facilitate determination of weld quality using techniques described above, since deviations in welding parameters, due to varying conditions and/or adaptive control, are isolated. For instance, the adjusted welding parameters can be input to weld evaluation logic 1846, which can be substantially similar to monitor M or monitor M' described previously. That is, the weld evaluation logic 1846 can monitor or measure the adjusted welding parameters and calculate corresponding quality parameters and/or quality indicators. Moreover, the weld evaluation logic 1846 can compare calculated quality parameters and/or quality indicators with training data.

According to another aspect, the estimation logic 1842 can generate an adaptation model based on the noise parameters and knowledge of the adaptability algorithms employed by controller 1810. The adaptation model can be utilized to render appropriate adjustments to monitoring welding parameters. For instance, thresholds or other characteristics of weld evaluation logic 1846, utilized to monitor parameters and calculate quality metrics as described above, can be configured based on the adaptation model to account for welding parameter values altered because of adaptive control.

Figure 20:
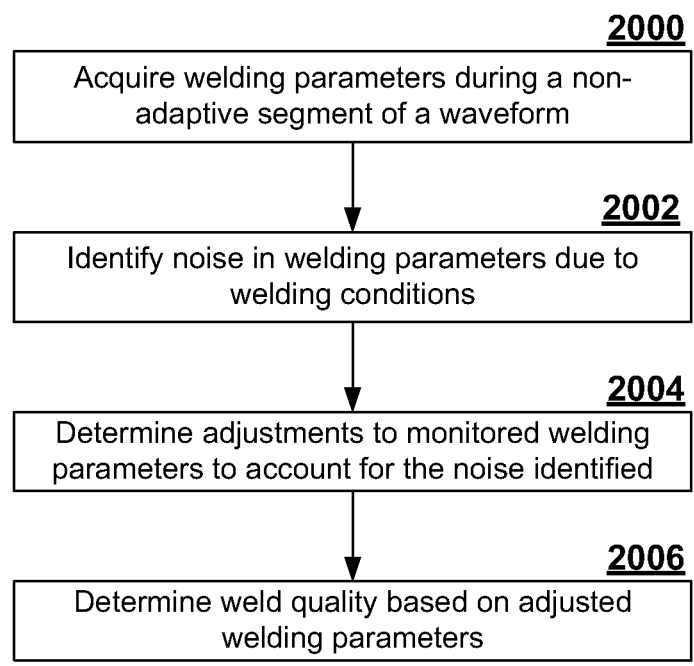
FIG. 20 illustrates a flowchart of a method for determining a quality of a weld by monitoring a welder as the welder performs a welding process by creating actual welding parameters between an advancing wire and a workpiece.

FIG. 20 illustrates a flowchart of a method for determining a quality of a weld by monitoring a welder as the welder performs a welding process by creating actual welding parameters between an advancing wire and a workpiece. The method depicted in FIG. 20 can be performed by system 1800, for example. At step 2000, welding parameters are acquired (i.e., monitored or measured) during a non-adaptive segment of a waveform. At step 2002, noise in the welding parameters due to different welding conditions is identified. At step 2004, adjustments to measured welding parameters or how welding parameters are measured are determined to account for the noise identified. For example, measured welding parameters from adaptive and non-adaptive portions of the waveform are filtered to remove the noise. In another example, the metrics used to measure welding parameters from adaptive and non-adaptive portions of the waveform are configured to account for command signals adaptively applied for changing welding conditions. At step 2006, weld quality is determined based on adjusted welding parameters.

In summary, an arc welding system and methods are disclosed. For example, in one embodiment, a method of determining a quality of a weld by monitoring a welder as the welder performs a welding process by creating actual welding parameters between an advancing wire and a workpiece is provided. The welding process is defined by a series of rapidly repeating wave shapes controlled by command signals to a power supply of the welder. The method includes segmenting a wave shape, having a weld cycle with a cycle time, into a series of time-segmented states. The method also includes selecting a non-adaptive state from the series of time-segmented states. The non-adaptive state represents a segment of the wave shape where the command signals remain invariable under different weld conditions. The method further include measuring a plurality of weld parameters generated between the advancing wire and the workpiece during the non-adaptive state at an interrogation rate over an interval of time. In addition, the method includes calculating a plurality of quality parameters for the non-adaptive state based on measurements of the plurality of weld parameters acquired during the interval of time within the non-adaptive state.

According to an example, the method can further include measuring the plurality of weld parameters occurring in the non-adaptive state repeatedly at the interrogation rate for a plurality of intervals of time; and repeatedly calculating the plurality of quality parameters for respective measurements acquired for the plurality of intervals of time.

According to another example, for a quality parameter of the plurality of quality parameters, the method can include comparing a value of each of the quality parameter calculated for the interval of time to a corresponding expected quality parameter value to determine if a difference between the value of the quality parameter calculated and the expected quality parameter value exceeds a predetermined threshold. When the difference exceeds the predetermined threshold, the method can include weighting the value of the quality parameter calculated with a magnitude weight based on the difference, and weighting the value of the quality parameter calculated with a time contribution weight based on a time contribution of the interval of time to the wave shape including the interval of time. The method can also include calculating a quality indicator for the interval of time based on weighted values of the quality parameters. Further still, the method can include aggregating a plurality of quality indicators respectively associated with a plurality of intervals of time; and calculating an overall quality indicator for the welding process based on the plurality of quality indicators aggregated.

According to another aspect, the method can include utilizing the plurality of quality parameters calculated for the non-adaptive state as training data to evaluate subsequent welding processes.

According to yet another aspect, the method can include monitoring values for the command signals during the non-adaptive state at the interrogation rate repeatedly over a plurality of intervals of time. Further to this aspect, the method includes calculating noise parameters based, at least in part, on differences between the values of the command signals monitored and the measurements of the plurality of weld parameters acquired during the plurality of intervals of time.

In addition, the method can include measuring the plurality of weld parameters generated between the advancing wire and the workpiece during one or more adaptive states from the series of time-segmented states; and adjusting the plurality of weld parameters measured in the one or more adaptive states based on the noise parameters calculated based on the non-adaptive state. Further, the method can include calculating the plurality of quality parameters for the one or more adaptive states based on adjusted measurements of the plurality of weld parameters acquired during the one or more adaptive states.

Alternatively, the method can include calculating an adaptation model based on the noise parameters, wherein the adaptation model represents changes to command signals by an adaptive controller of the welder to account for weld conditions. Further to this example, the method can include measuring the plurality of weld parameters generated between the advancing wire and the workpiece during one or more adaptive states from the series of time-segmented states; and adjusting the plurality of weld parameters measured in the one or more adaptive states based on the adaptation model.

According to another example, a system for determining a quality of a weld by monitoring a welder as the welder performs a welding process by creating actual welding parameters between an advancing wire and a workpiece. The welding process being defined by a series of rapidly repeating wave shapes controlled by command signals to a power supply of the welder. The system includes a logic state controller for segmenting a wave shape, having a weld cycle with a cycle time, into a series of time-segmented states. The system further includes a selection circuit for selecting a non-adaptive state from the series of time-segmented states. The non-adaptive state represents a segment of the wave shape where the command signals remain invariable under different weld conditions. The system also includes a monitor circuit configured to measure a plurality of weld parameters generated between the advancing wire and the workpiece during the non-adaptive state at an interrogation rate over an interval of time. In addition, the system includes a circuit for calculating a plurality of quality parameters for the non-adaptive state based on measurements of the plurality of weld parameters acquired during the interval of time within the non-adaptive state.

In an aspect, the monitor circuit is further configured to measure the plurality of weld parameters occurring in the non-adaptive state repeatedly at the interrogation rate for a plurality of intervals of time, and the circuit for calculating the plurality of quality parameters is further configured to repeatedly calculate the plurality of quality parameters for respective measurements acquired for the plurality of intervals of time.

According to another aspect, for a quality parameter of the plurality of quality parameters, the system further includes a circuit for comparing a value of each of the quality parameter calculated for the interval of time to a corresponding expected quality parameter value to determine if a difference between the value of the quality parameter calculated and the expected quality parameter value exceeds a predetermined threshold; a circuit for weighting the value of the quality parameter calculated with a magnitude weight based on the difference; and a circuit for weighting the value of the quality parameter calculated with a time contribution weight based on a time contribution of the interval of time to the wave shape including the interval of time.

In yet another aspect, the system includes an estimation circuit for monitoring values of the command signals during the non-adaptive state at the interrogation rate repeatedly over a plurality of intervals of time, and for calculating noise parameters based, at least in part, on differences between the values of the command signals monitored and the measurements of the plurality of weld parameters acquired during the plurality of intervals of time. Further to this aspect, the monitor circuit is further configured to measure the plurality of weld parameters generated between the advancing wire and the workpiece during one or more adaptive states from the series of time-segmented states and the system can also include a filter circuit for adjusting the plurality of weld parameters measured in the one or more adaptive states based on the noise parameters calculated based on the non-adaptive state. The circuit for calculating the plurality of quality parameters is further configured to calculate the plurality of quality parameters for the one or more adaptive states based on adjusted measurements of the plurality of weld parameters acquired during the one or more adaptive states.

Alternatively, the system can include a circuit for calculating an adaptation model based on the noise parameters, wherein the adaptation model represents changes to command signals by an adaptive controller of the welder to account for weld conditions. Further to this aspect, the monitor circuit is further configured to measure the plurality of weld parameters generated between the advancing wire and the workpiece during one or more adaptive states from the series of time-segmented states, and adjust the plurality of weld parameters measured in the one or more adaptive states based on the adaptation model.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not typically limited to one of a manual welding process or an automated (e.g., robotic) welding process but instead are readily adaptable to either. Furthermore, the general inventive concepts are readily adaptable to different welding processes and techniques (e.g., all variations of arc welding such as Stick and TIG welding). It is sought, therefore, to cover all such changes and modifications as fall within the spirit and scope of the general inventive concepts, as defined by the appended claims, and equivalents thereof.

What is claimed is:

1. A method of determining a quality of a weld by monitoring a welder as the welder performs a welding process by creating actual welding parameters between an advancing wire and a workpiece, the welding process being defined by a series of rapidly repeating wave shapes controlled by command signals to a power supply of the welder, said method comprising:
    segmenting a wave shape, having a weld cycle with a cycle time, into a series of time-segmented states;
    selecting a non-adaptive state from the series of time-segmented states, wherein the non-adaptive state represents a segment of the wave shape where the command signals remain invariable under different weld conditions;
    measuring a plurality of weld parameters generated between the advancing wire and the workpiece during the non-adaptive state at an interrogation rate over an interval of time; and
    calculating a plurality of quality parameters for the non-adaptive state based on measurements of the plurality of weld parameters acquired during the interval of time within the non-adaptive state, the step of calculating comprising:
        comparing a value of each of the quality parameter calculated for the interval of time to a corresponding expected quality parameter value to determine if a difference between the value of the quality parameter calculated and the expected quality parameter value exceeds a predetermined threshold; and when the difference exceeds the predetermined threshold,
            weighting the value of the quality parameter calculated with a magnitude weight based on the difference, and
            weighting the value of the quality parameter calculated with a time contribution weight based on a time contribution of the interval of time to the wave shape including the interval of time.

2. The method of claim 1, further comprising:
measuring the plurality of weld parameters occurring in the non-adaptive state repeatedly at the interrogation rate for a plurality of intervals of time; and
repeatedly calculating the plurality of quality parameters for respective measurements acquired for the plurality of intervals of time.

3. The method of claim 1, further comprising
calculating a quality indicator for the interval of time based on weighted values of the quality parameters.

4. The method of claim 3, further comprising:
aggregating a plurality of quality indicators respectively associated with a plurality of intervals of time; and
calculating an overall quality indicator for the welding process based on the plurality of quality indicators aggregated.

5. The method of claim 1, further comprising
utilizing the plurality of quality parameters calculated for the non-adaptive state as training data to evaluate subsequent welding processes.

6. The method of claim 1, further comprising
monitoring values for the command signals during the non-adaptive state at the interrogation rate repeatedly over a plurality of intervals of time.

7. The method of claim 6, further comprising
calculating noise parameters based, at least in part, on differences between the values of the command signals monitored and the measurements of the plurality of weld parameters acquired during the plurality of intervals of time.

8. The method of claim ,7 further comprising:
measuring the plurality of weld parameters generated between the advancing wire and the workpiece during one or more adaptive states from the series of time-segmented states; and
adjusting the plurality of weld parameters measured in the one or more adaptive states based on the noise parameters calculated based on the non-adaptive state.

9. The method of claim 8, further comprising:
calculating the plurality of quality parameters for the one or more adaptive states based on adjusted measurements of the plurality of weld parameters acquired during the one or more adaptive states.

10. The method of claim 7, further comprising:
calculating an adaptation model based on the noise parameters, wherein the adaptation model represents changes to command signals by an adaptive controller of the welder to account for weld conditions.

11. The method of claim 10, further comprising:
measuring the plurality of weld parameters generated between the advancing wire and the workpiece during one or more adaptive states from the series of time-segmented states; and
adjusting the plurality of weld parameters measured in the one or more adaptive states based on the adaptation model.

12. A system for determining a quality of a weld by monitoring a welder as the welder performs a welding process by creating actual welding parameters between an advancing wire and a workpiece, the welding process being defined by a series of rapidly repeating wave shapes controlled by command signals to a power supply of the welder, the system comprising:
 a logic state controller for segmenting a wave shape, having a weld cycle with a cycle time, into a series of time-segmented states;
 a selection circuit for selecting a non-adaptive state from the series of time-segmented states, wherein the non-adaptive state represents a segment of the wave shape where the command signals remain invariable under different weld conditions;
 a monitor circuit configured to measure a plurality of weld parameters generated between the advancing wire and the workpiece during the non-adaptive state at an interrogation rate over an interval of time; and;
 a circuit for calculating a plurality of quality parameters for the non-adaptive state based on measurements of the plurality of weld parameters acquired during the interval of time within the non-adaptive state; and wherein the circuit for calculating further comprises:
  a circuit for comparing a value of each of the quality parameter calculated for the interval of time to a corresponding expected quality parameter value to determine if a difference between the value of the quality parameter calculated and the expected quality parameter value exceeds a predetermined threshold;
  a circuit for weighting the value of the quality parameter calculated with a magnitude weight based on the difference; and
  a circuit for weighting the value of the quality parameter calculated with a time contribution weight based on a time contribution of the interval of time to the wave shape including the interval of time.

13. The system of claim 12, wherein
the monitor circuit is further configured to measure the plurality of weld parameters occurring in the non-adaptive state repeatedly at the interrogation rate for a plurality of intervals of time; and
wherein the circuit for calculating the plurality of quality parameters is further configured to repeatedly calculate the plurality of quality parameters for respective measurements acquired for the plurality of intervals of time.

14. The system of claim 12, further comprising
an estimation circuit for monitoring values of the command signals during the non-adaptive state at the interrogation rate repeatedly over a plurality of intervals of time, and for calculating noise parameters based, at least in part, on differences between the values of the command signals monitored and the measurements of the plurality of weld parameters acquired during the plurality of intervals of time.

15. The system of claim 14, wherein
the monitor circuit is further configured to measure the plurality of weld parameters generated between the advancing wire and the workpiece during one or more adaptive states from the series of time-segmented states, and the system further comprises:
 a filter circuit for adjusting the plurality of weld parameters measured in the one or more adaptive states based on the noise parameters calculated based on the non-adaptive state.

16. The system of claim 15, wherein
the circuit for calculating the plurality of quality parameters is further configured to calculate the plurality of quality parameters for the one or more adaptive states based on adjusted measurements of the plurality of weld parameters acquired during the one or more adaptive states.

17. The system of claim 14, further comprising
a circuit for calculating an adaptation model based on the noise parameters, wherein the adaptation model represents changes to command signals by an adaptive controller of the welder to account for weld conditions.

18. The system of claim 17, wherein
the monitor circuit is further configured to measure the plurality of weld parameters generated between the advancing wire and the workpiece during one or more adaptive states from the series of time-segmented states, and adjust the plurality of weld parameters measured in the one or more adaptive states based on the adaptation model.

* * * * *